United States Patent [19]
Rutledge

[11] 3,818,302
[45] June 18, 1974

[54] CONTROL APPARATUS FOR A WAREHOUSING SHELF LOCATOR

[76] Inventor: Melvin C. Rutledge, 410 Park Pl., Fort Lee, N.J. 07524

[22] Filed: May 12, 1972

[21] Appl. No.: 252,601

Related U.S. Application Data

[63] Continuation-in-part of Ser. No. 849, Jan. 6, 1970.

[52] U.S. Cl. ............... 318/600, 318/467, 187/9, 214/16.4 A, 318/574
[51] Int. Cl. ............................... G05b 19/26
[58] Field of Search ............ 318/574, 467, 600–603; 187/9, 29; 214/16.4 A

[56] References Cited
UNITED STATES PATENTS

| | | | |
|---|---|---|---|
| 2,484,049 | 10/1949 | Putt | 318/600 |
| 3,243,780 | 3/1966 | Bendick et al. | 318/601 X |
| 3,285,437 | 11/1966 | Lemelson | 318/574 X |
| 3,402,836 | 9/1968 | Debrey et al. | 318/602 X |
| 3,406,846 | 10/1968 | O'Connor | 318/601 X |
| 3,425,515 | 2/1969 | McDonald et al. | 318/603 X |
| 3,504,245 | 3/1970 | Cotton et al. | 318/601 X |
| 3,531,705 | 9/1970 | Rosin et al. | 318/467 X |
| 3,723,841 | 3/1973 | Cotton et al. | 318/574 |
| 3,734,310 | 4/1973 | Miller | 318/600 X |

*Primary Examiner*—T. E. Lynch
*Attorney, Agent, or Firm*—Thomas E. Tate

[57] ABSTRACT

A method, control device and shelf selector system for governing operating functions in positioning loading devices, such as the fork of a forklift, to load or discharge pallets at shelves of desired preselected levels. The shelf selector system includes a control device which is provided with a carrier assembly apparatus having a multiple position cam selector section operable to move past a sensor section to selectively contact a plurality of cam followers of control switches of the sensor section. The cam followers in turn actuate the control switches, one of which may be preselectively set by an operator-operative selector switch means to de-energize a motor means or motor-pump unit for controlling the position of the fork of the forklift so as to stop the fork at a desired position in relation to a preselected shelf level. The shelf selector system includes, with the control device, a compact operator-operative selector switch means interconnected to the control switches of the sensor section of the carrier assembly apparatus and thereby to forklift controls to govern the position of the fork in relation to selected shelf levels. The selector switch means and control switches may govern other functions in the positioning and rate of speed of the fork of the forklift, as well as serve to selectively effect a load retrieval and a load discharge operation through the positioning of the fork at a reduced rate of speed in relation to the preselected shelf in alternate selected senses.

7 Claims, 15 Drawing Figures

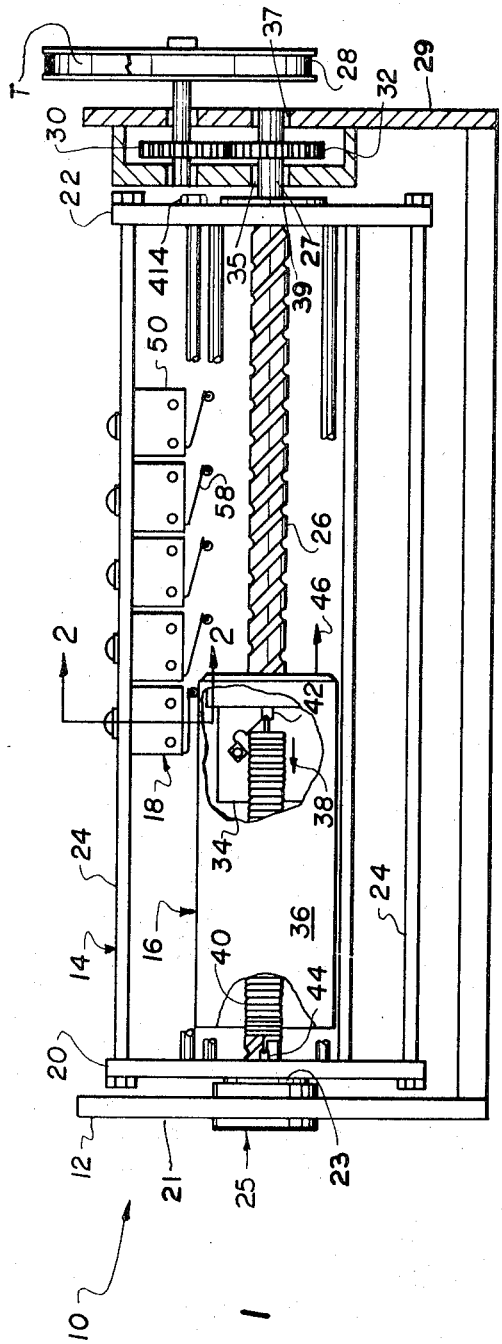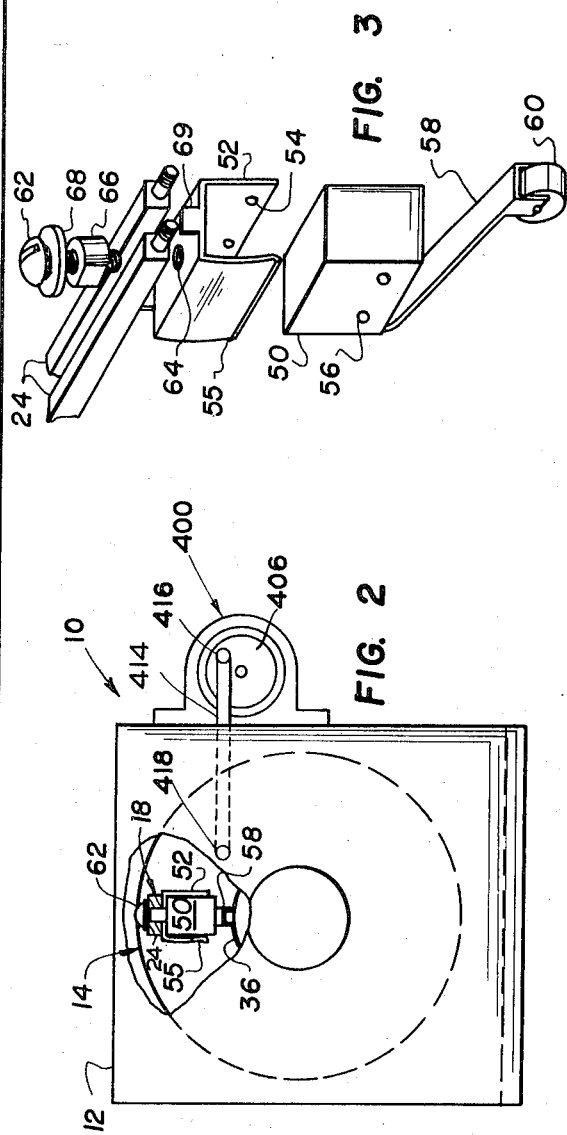

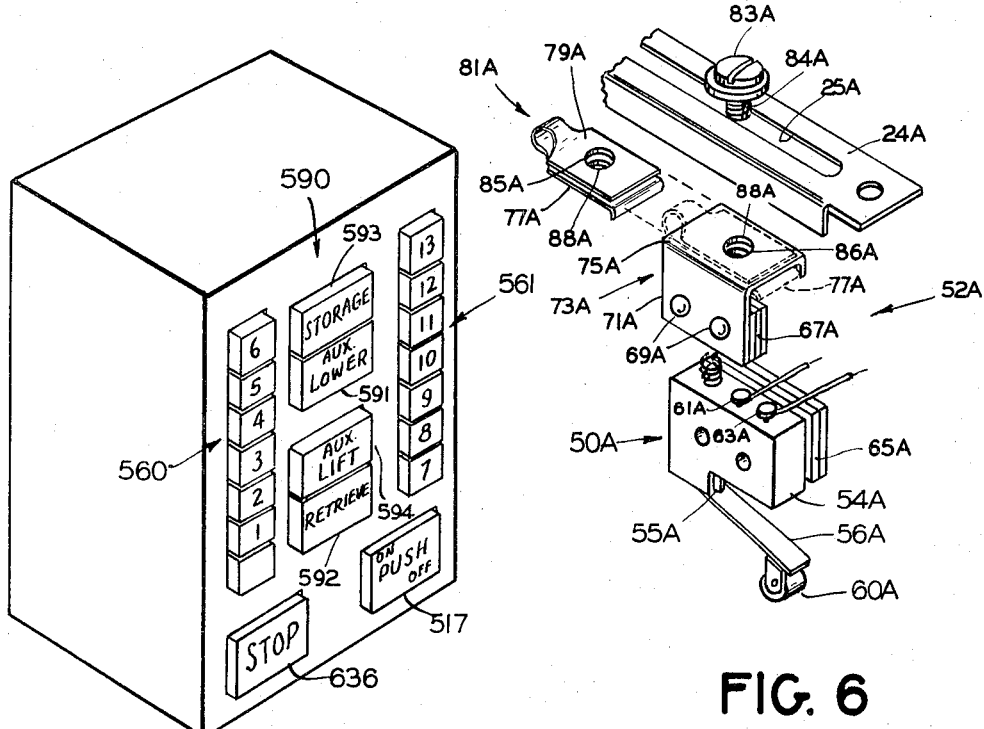
FIG. 6
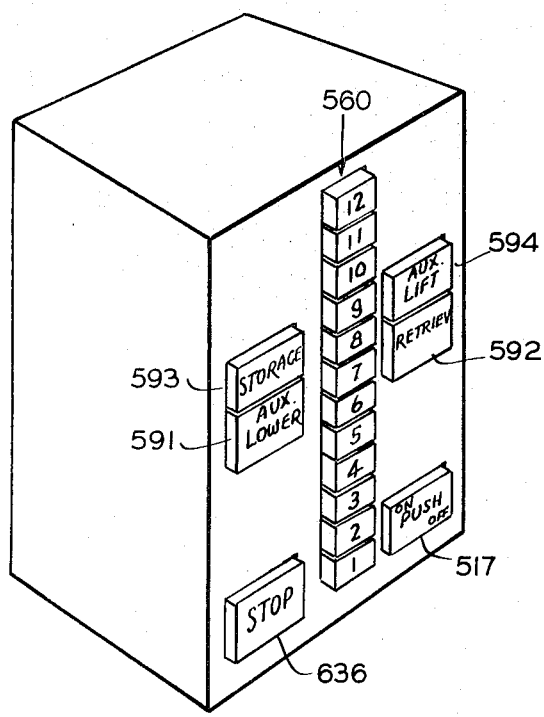
FIG. 7
FIG. 8
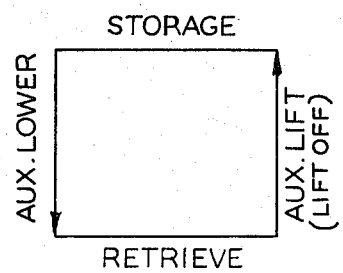
FIG. 9

CONTROL APPARATUS FOR A WAREHOUSING SHELF LOCATOR

CROSS-REFERENCE TO RELATED APPLICATION

This application is a continuation-in-part of my co-pending application Ser. No. 849, filed Jan. 6, 1970.

1. Field of the Invention

This invention relates generally to loading and unloading methods and devices and, particularly, to a method, control device and shelf selector system for positioning a forklift device to load or discharge pallets at preselected levels which may too high for accurate visual positioning. The invention pertains, more specifically, to an improved control network including a compact apparatus to sense the positioning of the forklift device and a compact operator-operative level selector control means for effective faster and more efficient material handling in governing the positioning of the forklift device to load or discharge the pallets at preselected shelf levels.

2. Discussion of the Prior Art

Heretofore there have been provided complex and cumbersome mechanisms for effecting selective control of the positioning of a fork or a forklift to preselected levels to provide a loading or unloading operation relative to storage shelves. Such mechanisms are exemplified by the patents discussed below.

In the mechanism disclosed in the British Pat. No. 1,037,382 there is provided an elongated cam cylinder 26 (FIG. 1) or 90 (FIG. 10) which extends substantially the length of an upright mast 14 (FIG. 1), up and down which runs a lift carriage 15 having an upright backplate 18. In both forms of the control mechanism of this patent, the cam cylinders 26 and 90 may be rotated by the operator manually manipulating the control knob 29 and gearing 27, while the cam cylinder may be axially positioned by the operator manually manipulating the operating lever 37, cable 36 and yoke 31, pivoted at 33 (FIGS. 1 and 10), so that operation of the switches 40 and 91 through the conformations of the cam may be delayed or advanced.

Moreover, in both forms of the control mechanism, in order to effect the actual pick-up of a load from a storage shelf as well as to effect a lowering of a load to a storage shelf so as to discharge the load gently onto the shelf in such a manner as to prevent shock to the load, it is necessary for the operator to manually manipulate the controls for such control mechanism subject to the judgement of discretion of the operator under operating conditions which may not be conducive to accurate visual positioning of the fork of the forklift, as where the forklift may be used to load and unload equipment or pallets at levels too high for accurate visual positioning.

There has been noted of interest Canadian Pat. No. 708,047 which has spaced along the mast of the forklift or sleeve 12 at various heights and intervals, as desired, a series of height sensing units 15 to sense the position of the load carrier 9. A control unit may be arranged to preselect for operation a particular one of the sensing units so as to enable the load carrier to move to a preselected shelf height under control of the selected sensing unit. However, in the Canadian patent, there is provided a manually operable valve control lever 97 which is utilized to operate the lift ram so as to effect, under manual control, the pick-up or discharge of a load relative to the preselected shelf.

There has been also noted of interest U.S. Pat. No. 3,319,816, which teaches a push button console type control means by which the operator may control the vertical position of the fork of the lift truck through the provision of a lift bridge control circuit. The lift bridge control circuit includes switches 200 and 203 which serve to switch a resistor 204 into the bridge control circuit to produce a predetermined vertical unbalance in the bridge circuit when the variable resistors 42 and 43 sense that the position of the fork assembly 31 is at ground level. However, the mode of operation is such that, as explained in this patent, the driver or operator must determine the desired lift and tilt positions of the fork assembly for depositing the load on a storage shelf or picking up a load from a storage shelf. In order to effect such mode of operation, it is necessary for the operator to manually manipulate the push button controls subject to his discretion or judgment.

Furthermore, there has been noted U.S. Pat. No. 3,034,675,, which discloses a control apparatus, including an elongated flexible sensing rod 23 which is carried by the carriage and is operable to effectively control vertical movement of a load carriage and, in particular, the loading and unloading of pallet supported loads onto and from high overhead shelves or racks.

U.S. Pat. No. 3,389,814 is of interest in that it discloses means for sensing the presence of an article, pallet or load on the forks of a crane operative to initiate portions of a control cycle, i.e., a first sequence control effecting an unloading movement whereby load support means enters a selected shelf or bin in a high position and is lowered to deposit a load, and a second sequence control effecting a loading movement whereby said load support means enters the selected shelf or bin in a low position and is raised to pick up a load.

Also of interest are U.S. Pat. Nos. 2,740,495 and No. 2,758,675. In the last mentioned patent, a two-speed system includes a switch assembly effective to provide a high leveling driving speed for an elevator car within a predetermined distance from the selected floor level but, when the car has traveled a further distance approaching within a predetermined limited distance of the selected floor level, the switch assembly is effective to provide a low leveling driving speed for the car until the elevator car is stopped at the selected floor level.

There is no suggestion in the aforenoted patents of the simplified compact structural arrangement common to the control device of the several forms of the system of the present invention. Such control device is of that class or worthy and sustainable inventions whereby adding a new idea and a new feature in assembling older features in a given mechanism an improved result is reaches at less expense, particularly in the herein disclosed control device in which there has been provided in a carrier assembly apparatus a structural arrangement of longitudinally extending supporting rods circumferentially located about a lead screw and cam means supported by the lead screw, together with means mounting control elements on the supporting rods along a longitudinal path of travel of the cam means on the screw shaft. Moreover, in such structural arrangement, cam followers of the control elements extend in a predetermined cooperative relation with the cam means and are arranged for use in a shelf selector system, including operator-operative means to selectively render one or more of said control elements effective to limit the lift position of the fork of a forklift to a desired preselected level or govern other functions in the positioning and rate of speed in the positioning of the fork of the forklift.

Furthermore, the aforenoted patents fail to suggest the disclosed arrangement of the control device in which there is provided a supporting frame structure for the carrier assembly apparatus, together with means pivotally mounting the aforenoted carrier assembly apparatus in the supporting frame structure as well as means coupling the cam means to the carrier assembly apparatus. The carrier assembly apparatus is cooperatively arranged in relation to suitable motor means so as to permit the motor means to pivotally position the carrier assembly apparatus in the supporting frame structure. The motor means may be operatively controlled so as to angularly position the carrier assembly apparatus in one sense about the pivotal mounting means and relative to the lead screw in such a manner as to cause the cam means coupled to the carrier assembly apparatus to be longitudinally adjusted on the lead screw in a sense for leading the rotation of the lead screw. Alternatively, the motor means may be operatively controlled so as to angularly position the carrier assembly apparatus in another and opposite sense about the pivotal mounting means and relative to the lead screw in such a manner as to cause the cam means, coupled to the carrier assembly apparatus, to be longitudinally adjusted on the lead screw in an opposite sense for lagging the rotation of the lead screw. The adjustment of the cam means on the lead screw in said leading or lagging senses serves to properly locate the fork of the forklift at the selected rack shelf location corresponding, respectively, to a loading pattern or alternatively to a discharging pattern of operation of the fork.

Further, the aforenoted patents fail to show a true recognition of the problem to which the present invention has been directed, particularly in the novel method and the concept of means of effecting extreme accuracy in locating the fork of a forklift in relation to a selected shelf rack for storing a load on the shelf rack or retrieving a load from the shelf rack. Thus the method and concept of means of the present invention, as applied to the preferred embodiment, provides an improvement in the totality of effect with respect to speed, efficiency and accuracy of operation.

Moreover, as distinguished from the disclosures of the above-noted patents, in the preferred embodiment of the invention during the storing of a load on a selected shelf, the fork of the forklift is lowered at a relatively slow rate of speed from an initial storage level location immediately above the selected rack shelf to a predetermined level at a location immediately below the selected shelf in a mode of operation which causes the fork to gently place the load on the selected shelf in an auxiliary lowering action or step effected by such manipulation of the fork of the forklift. Conversely, in retrieving a load from a selected shelf of a storage rack, the fork of the forklift is raised at a relatively slow rate of speed from the initial retrieve level location immediately below the selected shelf to the initial storage level location immediately above the selected shelf. Such positioning of the fork causes the fork to retrieve the load from the selected shelf with a minimum of stress in an auxiliary lift action or step effected by such manipulation of the fork of the forklift.

Furthermore, there is no suggestion in the above-noted patents of a console type control, including means selectively operable by the operator to position the fork of the forklift through a shelf level sensor means to a preselected level relative to a storage rack shelf and thereafter manipulate the fork at a slow rate of speed in an auxiliary lowering and auxiliary lift action in the steps of storing and retrieving a load from the storage rack shelf by the heretofore noted method and idea of means for effecting extreme accuracy in locating a fork of a forklift in relation to a selected shelf rack.

SUMMARY OF THE INVENTION

The present invention relates to a simplified method, apparatus and system for governing lift operating functions for positioning a loading device of the fork of a forklift so as to load or discharge pallets at preselected shelf levels.

An object of the invention is to provide a carrier assembly apparatus or shelf level sensor means of a simplified compact structure for use in a system for governing the lift position of the fork of the forklift to a preselected level relative to a selected shelf rack.

Another object of the invention is to provide a console type control for use in a shelf level selector system, including means selectively operable by the operator to position the fork of the forklift through operation of a shelf level sensor means and lift motor of the system. Thus the fork may be positioned to a preselected level relative to a selected rack shelf dependent upon an operator-selected function of storage or retrieve effected by the operation of the console type control, and, thereafter, the fork may be manipulated at a slow rate of speed in an auxiliary lowering action selectively effected by the operator following the positioning of the fork to a storage level location. Such positioning of the fork causes the fork to place the load gently on the shelf as the fork is lowered to the retrieve level location or the fork may be manipulated at a slot rate of speed in an auxiliary lift action selectively effected by the operator following the posistioning of the fork initially to the retrieve level location. Such positioning of the fork causes the fork to lift the load placed on the selected shelf rack as the fork is positioned to the storage level location immediately above the selected rack shelf.

Another object of the invention is to provide a method for effecting extreme accuracy in locating the fork of a forklift in relation to a selected shelf rack for storing a load on the selected shelf or retrieving a load from the selected shelf by the aforenoted manipulation of the fork in relation to the selected shelf.

Another object of the invention is to provide in a console type control selectively operable switch means to effectively control the positioning of the fork relative to a selected shelf rack dependent upon a selected load or retrieve function effected by an operator-operative function selecting switch means to provide selectively the aforenoted auxiliary lowering or auxiliary lifting action.

Another object of the invention is to provide in aforenoted console type control a solenoid operated latching means for loaking the selected switch means in an operative position, and a reset solenoid effective upon completion of a selected cycle of operation to release the latching means and thereupon permit the selected switch means to return to a normal inoperative position, and other operator-operative emergency switch means to de-energize the latching solenoid means and energize the reset solenoid.

Another object of the invention is to provide a shelf selector system including means to decelerate the positioning of a fork of a forklift upon reaching a preselected level relative to a selected level, the decelerating means being constructed and arranged to permit a lift motor to position the fork at a maximum lift speed, while the decelerating means becomes effective as the fork approaches a critical level location within a predetermined range of the preselected shelf level, which critical level may be above the preselected shelf level to effect a discharge function of a load by the fork onto the selected shelf; and, alternatively, the critical level location may be below the preselected shelf level to effect a retrieval function of a load by the fork from the shelf, the system also including selectively operable means to effect the discharge function by a lowering of the fork at a relatively slow rate of speed from initial storage level to below the selected shelf location in a discharging operation of the fork which gently places the load on the selected shelf rack so as to prevent load shock, the system further including other selectively operable means to effect the retrieval function by a raising of the fork at a slow rate of speed from the initial retrieve level location to the storage level location to cause the fork to lift a load off of the selected shelf rack a predetermined precise distance to avoid contact of the fork in the lifting action with the bottom of the next higher shelf of the storage rack.

These and other objects and features of the invention are pointed out in the following description in terms of the emboidments thereof which are shown in the accompanying drawings.

DESCRIPTION OF THE DRAWINGS

In the drawings in which corresponding parts have been indicated by corresponding numerals:

FIG. 1 is a side sectional view of a control device including a carrier assembly apparatus or shelf level sensor means for an automatic shelf selector system of one embodiment of the invention;

FIG. 2 is an end view of the control device in which the carrier assembly apparatus is shown partially in sectional view taken along the lines 2—2 of FIG. 1 and looking in the direction of the arrows;

FIG. 3 is an enlarged perspective detail exploded view of one of the switch mountings of the carrier assembly apparatus shown in FIG. 1;

FIG. 6 is a perspective detail exploded view of one of the switch mountings of the carrier assembly apparatus shown by FIG. 5;

FIG. 7 is a perspective view of a control console of a split level selector type for use in a preferred form of automatic shelf selector system which may embody the form of the carrier assembly apparatus of FIG. 5;

FIG. 8 is a perspective view of a control console of a split function selector type for use in a preferred form of automatic shelf selector system which may embody the form of the carrier assembly apparatus of FIG. 5;

FIG. 9 is a graphitcal illustration of the storage and retrieve functions effected by an operator-operative control console of the types illustrated by FIGS. 7 and 8;

FIRST EMBODIMENT OF THE INVENTION

Figure 4:
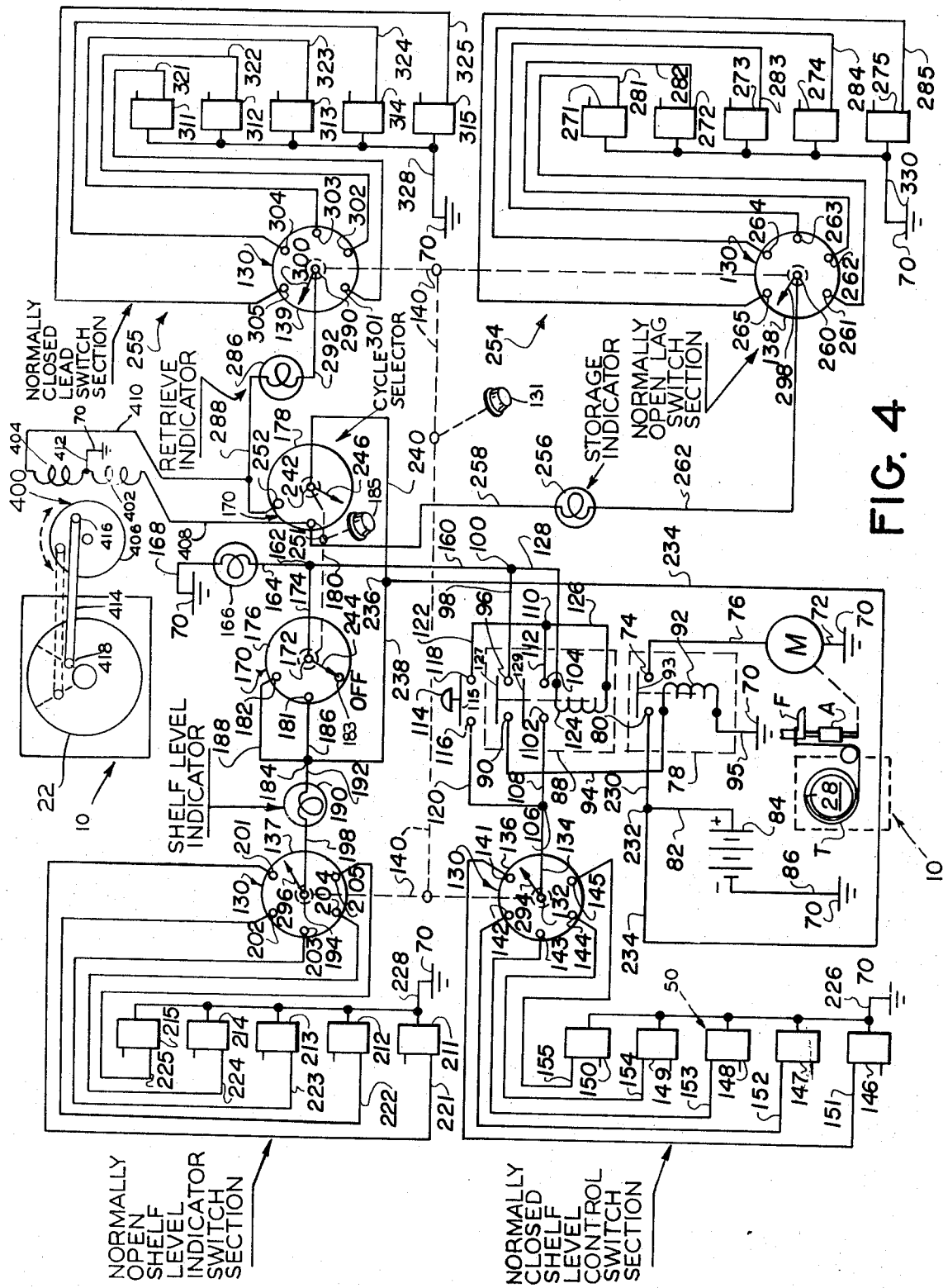
FIG. 4 is a schematic wiring diagram illustrating the electrical control network for an automatic shelf selector system embodying the control device of FIG. 1.

Referring to the drawing of FIG. 1, there is shown one form of a control device 10 of an automatic shelf selector for automatically positioning loading devices, such as the forks of forklifts, to load or discharge pallets at preselected levels too high for accurate visual positioning. The control device 10 comprises a frame structure 12, supporting an adjustable carrier assembly apparatus 14 comprising a multiple position cam selector section means 16 and a shelf level sensor section means 18. The carrier assembly apparatus 14 includes a pair of spaced carrier frame plates 20 and 22 supported by a plurality of square carrier tie rods 24. The carrier assembly apparatus 14 is supported within the frame structure 12 at the frame plate 20 in a preselected angular position by a shaft or bushing 23 which projects from a supporting member 25 mounted in an end plate 21 of the frame 12 and between the plates 20 and 21. An operating shaft 27 for the cam means 16 projects through an opposite end plate 29 of the frame 12 and the plate 22 of the carrier assembly means 14.

The cam selector means 16 includes a ball bearing lead screw 26. The lead screw 26 is rotated by the operating shaft 27 driven by a pulley or drum 28 which in turn is rotated by a spring loaded tape T extendable by forks F of a forklift driven upwardly by an actuator A powered by motor-pump unit M, as shown diagrammatically in FIG. 4, and retractable by a spring action of the spring loaded tape T as forks F may return downwardly under control of an operator, as hereinafter more fully described.

That is, as shown in the drawing of FIG. 1, the drum 28 rotates a coaxial pinion gear 30 meshing with a lead screw gear 32 which is coaxially engaged with the shaft 27 of the lead screw 26 for driving the same. The shaft 27 is rotatably mounted in suitable bearings 35 and 37 provided in the end plate 29 of the supporting frame structure 12, and further the shaft 27 projects through and is rotatably mounted in a suitable bearing 39 provided in the carrier frame plate 22. Riding longitudinally of the lead screw 26 of the cam selector means 16, upon the carrier assembly means 14 being held fixed from angular movement, is a ball bearing load screw nut 34 which is integral to a cam sleeve 36. The cam sleeve 36 in turn is longitudinally movable relative to the lead screw 26 upon rotation of the one relative to the other, and the sleeve 36 is spring loaded in a direction shown by arrow 38 by a pair of springs 40. One of the springs 40 is arranged at one side of the lead screw 26 and nut 34, as shown by the drawing of FIG. 1, while another of the springs 40, not shown, is correspondingly arranged at an opposite side of the lead screw 26 and nut 34. Each spring 40 is attached by a spring retainer bracket 42 on the forward part of the movable cam sleeve 36 and anchored to the carrier assembly apparatus 14 by another spring retainer bracket 44 attached on the carrier frame plate 20. The arrangement of the springs 40 and retainer brackets 42 and 44 is such as to resiliently couple the cam sleeve 36 to the carrier assembly apparatus 14 so as to effectively anchor the cam sleeve 36 from angular movement relative to the carrier frame plate 20, while permitting the longitudinal movement of the cam sleeve 36 relative to the lead screw 26 upon angular movement of the lead screw 26 relative to the cam sleeve 36 and carrier means 14 relative one to the other, subject to the biasing force applied by the sqrings 40.

Therefore, as the forks F, shown diagrammatically by FIG. 4, are driven upwardly by the motor-pump M, tape T is drawn out to rotate the drum 28 which in turn rotates the lead screw 26, as shown by FIG. 1, to drive the movable cam sleeve 36 in a direction shown by arrow 46, of FIG. 1, in opposition to the biasing force of the springs 40, when the system is extended in the lift cycle of the forklift, while the tape T is retracted by springs 40 to rotate the lead screw 26 in an opposite sense so as to move the cam sleeve 36 in a direction shown by arrow 38 and under the biasing force of the springs 40 when the system is retracted under the control of an operator in the lowering cycle of the forklift.

The shelf level sensor section means 18 of FIG. 1 includes a plurality of microswitches or control elements 50 which are supported on the tie rods 24 by means of spring loaded brackets 52, shown by FIG. 2. Each spring bracket 52, as shown by FIG. 3, includes a pair of protuberances 54 which are aligned and secured by a spring bracket side wall 55 within a matched pair of holes 56 in a body portion of the microswitch 50.

Supported by each microswitch 50 is a cam follower 58 having a cam roller 60 which is so arranged as to co-operatively contact the cam sleeve 36 for actuation of the microswitch 50 as the movable cam sleeve 36 progresses along the lead screw 26.

Each bracket 52, as shown by FIGS. 2 and 3, is supported by the two tie rods 24 and clamped in place by means of a screw 62 which is inserted within threaded hole 64 in the bracket 52. A spacer washer 66, interposed between the two tie rods 24, and a washer 68 are used in the clamping of the bracket 52, with the microswitch 50 at a selected predetermined location longitudinally of the carrier 14. In addition, a projection 69 of the bracket 52, is interposed between the tie rods 24 to prevent rotation of the bracket 52 about the screw 62. By movement of the bracket 52 along the tie rods 24, in a longitudinal direction of the carrier assembly apparatus 14, an adjustment can be made for the preselection of the fork height of the forklift to correspond with predetermined locations relative to the height of the rack shelves, as hereinafter more fully described.

Referring to the electrical network of FIG. 4, the motor-pump M, which drives the forks F, is electrically connected at one terminal of the electric motor M to ground potential 70 by a conductor 72, while an opposite terminal of the motor M is connected at the other end to a relay switch contact 74 by conductor 76. The switch contact 74 is part of a power relay 78 which includes a second switch contact 80 spaced from the contact 74 and connected through conductor 82 to a positive terminal of the battery 84. The battery 84 in turn has a negative terminal connected to ground potential 70 through a conductor 86.

When an electromagnetic coil 92 of the power relay 78 is energized, as hereinafter more fully described, it will cause a relay switch element 93 to close a circuit to connect contact 80 with contact 74 so as to direct current from the battery 84 to energize the motor-pump M to drive the forks F through actuator A to rotate drum 28, which in turn will drive the cam sleeve 36, as shown by FIG. 1, in the direction shown by arrow 46.

Connected to the power relay 78 is a holding relay 88 which includes a relay switch contact 90 connected to coil 92 of the power relay 78 through conductor 94. The coil 92 is also connected to ground potential 70 by a conductor 95. The holding relay 88 includes another relay switch contact 96 connected through conductor 98 to an electrical conductor 128 at joint 100.

Relay 88 also includes another pair of spaced relay switch contacts 102 and 104 which are respectively connected to an electrical conductor 120 at joint 106 through conductor 108 and to an electrical conductor 122 at joint 110 through conductor 112.

A push button spring return two-point make switch 114 controls the overall operation of the automatic shelf selector system. The push button 114, when depressed by a forklift operator, will cause an electrically conductive switch element 115 to connect switch contacts 116 and 118 which in turn will connect electrical joint 106 through conductor 120 and electrical joint 110 through conductor 122. Further, electrical joint 110 is connected to holding relay coil 124 through conductor 126. In turn coil 124 is connected at its other end to joint 100 through conductor 128.

Shelf-Level Switch Section

Upon the circuitry of FIG. 4 being placed in an operative condition, as hereinafter explained, and upon terminals 116 and 118 being connected by the electrically conductive switch element 115 upon the push button 114 being depressed, the relay coil 124 of the holding relay 88 will be energized to cause an electrically conductive switch element 127 to close switch contacts 90 and 96 while simultaneously a second electrically conductive switch element 129 will close switch contacts 102 and 104 so as to provide holding circuits to direct current through the holding relay coil 124 and the power relay coil 92, respectively. Such energization of the power relay coil 92 serves to cause the switch element 93 to connect switch contacts 74 and 80 to hold the power relay 78 closed to continuously energize the motor M to effect the extension of the forklift F and in turn cause rotation of the lead screw 26, as heretofore explained. The cam sleeve 36 will move in the direction shown by the arrow 46 in FIG. 1 until the cam 36 actuates a selected normally closed microswitch 50 to open the ground connection applied to the relay coil 124 of the holding relay 88 to in turn de-energize the winding 92 of the power relay 78 to open the relay switch contacts 74 and 80 to stop the motor M and thus stop the forks of the forklift at the desired preselected level.

In reference to FIG. 4, it is shown that the electrical joint 106 is connected to a five-point selector lift rotary switch 130 at a center terminal 132 through a conductor 134. The switch 130 is operable by a main rotary control knob 131 and include four coaxial connected sections 136, 137, 138 and 139 having a common control axle 140 angularly positioned by the main control knob 131. A shelf level switch section 136 of the switch 130 may have five or any number of selective switch contacts depending on the number of shelf levels the system is to operate. This system has a pattern of five levels and therefore each switch section has five switch contacts.

Section 136 has five points, or switch contacts, numbered 141, 142, 143, 144 and 145, which are selectively closed by operation of an angularly positioned switch arm 294 connected to the center terminal 132. These switch contacts are connected respectively to one terminal of normally closed microswitches 146, 147, 148, 149 and 150 through conductors 151, 152, 153, 154 and 155, respectively. An opposite terminal of each of these microswitches is connected by a common conductor 226 to ground 70 and in turn through the grounded conductor 86 to the negative terminal of the battery 84.

In the operation of the system, one of the normally closed switches 146 to 150 is selected by the operator angularly positioning the switch arm 294 by the selector switch knob 131 operably connected thereto by the common control axle 140. Thereafter, the cam sleeve 36 may be moved in a direction shown by the arrow 46, by the motor M to contact the selected switch 50 and open the energizing circuit for the control coil 124 of the holding relay 88 causing in turn the power relay 78 to open and terminate the current applied to the motor M which would in turn stop the extension of the fork of the forklift F at the desired level. For example, if the level to load or unload a pallet is on the storage rack's fourth shelf, the selector knob 131 will be adjusted so as to cause the control axle 140 to angularly position the switch arm 294 so as to connect terminals 132 and 144 of section 136 of the selector switch 130. That is, the microswitch 149 would then be so selected as to operate to open the circuit controlling the relay 88 and in turn relay 78 to effectively stop the motor M thereby positioning the fork of the forklift at the fourth shelf of the rack.

Operative Condition Control Switch

Moreover, connected to the electrical joint 100 through conductor 160 is an electrical joint 162 which in turn is connected through conductor 164 to one terminal of an on-off indicator light 166 having an opposite terminal in turn connected to ground 70 by conductor 168 and in turn through grounded conductor 86 to the negative terminal of battery 84. In addition, the electrical joint 162 is connected through a conductor 174 to a center terminal 172 of a rotary selector switch arm 244 of a cycle selector switch 170. The selector switch 170 includes two coaxially connected sections 176 and 178 having a common control axle 180 angularly positioned by a cycle control knob 185.

Selector switch arm 244 is arranged in cooperative relation to selectively close switch contacts 181, 182 and an open contact 183 upon the switch arm 244 being angularly positioned through the axle 180 by operation of the main control knob 185. The selector switch contacts 181 and 182 are joined to an electrical joint 184 by conductors 186 and 188 respectively, and upon closure by the switch arm 244 are effective to place the circuitry of FIG. 4 in a normal operative condition, while the open contact 183 may be selected by appropriate adjustment of the switch arm 244 to provide a non-operative condition.

Shelf Level Indicator Switch Section

In the aforenoted circuitry, the electrical joint 184 is connected to one terminal of a level indicator light 190 through conductor 192, while an opposite terminal of the indicator light 190 is connected through an electrical conductor 198 to a central terminal 194 of the section 137 and thereby to the selector switch arm 296. When the level indicator light 190 is on, or energized by closure of a normally open selected microswitch 211 to 215, it will signify that the forks of the forklift have reached their selected level for loading or unloading.

The switch section 137 includes five point terminals or switch contacts 201, 202, 203, 204 and 205 which are selectively closed by operation of the angularly positioned switch arm 296. These switch contacts are respectively connected to one terminal of normally open lift microswitches 211, 212, 213, 214 and 215 by conductors 221, 222, 223, 224 and 225, respectively, while an opposite terminal of each of these normally open microswitches is connected by a common conductor 228 to ground 70 and in turn through the grounded conductor 86 to the negative terminal of the battery 84. It should be noted that the normally closed switches 146 to 150 can be combined for selective operation with the respective normally open switches 211 to 215. Thus each of the combined switches will have two sets of contacts, a set of normally closed contacts and a set of normally opened contacts. An opening of the selected switch of the set of switches 146 to 150 will be accompanied by a closing of a corresponding selected switch of the set of switches 211 to 215 in which the switches of each set of switches have a terminal connected to ground potential 70 by conductors 226 and 228, respectively.

Cycle Selector Switch Section

As shown in FIG. 4, the switch contact 80 of the power relay 78 is connected through conductor 230 to electrical joint 232 which is connected to conductors 82 and a conductor 234. Conductor 234 in turn is connected at electrical joint 236 to conductors 238 and 240. The conductor 238 is connected to the electrical joint 184 while conductor 240 is connected to a central terminal 242 of section 178 of selector switch 170. Central terminals 172 and 242 include angularly positioned switch arms 244 and 246, respectively, and may be angularly positioned by the common control shaft 180 upon operation of the knob 185 by the operator. The switch arms 244 and 246 can be angularly positioned, respectively, so that switch arm 244 may selectively close contacts 181 and 182 or an open contact 183 of selector switch section 176, while switch arm 246 may selectively close switch contacts 251 and 252 of selector switch section 178.

The selector switch section 178 serves to selectively connect into the network of FIG. 4, a lag switch section 254 and a lead switch section 255 by the switch arm 246 being angularly positioned to selectively close switch contacts 251 and 252, respectively. The lag switch section 254 is connected to the switch contact 251 through a fork storage indicator light 256 by a conductor 258 leading from switch contact 251 to one terminal of the indicator light 256. The light 256 in turn is serially connected from an opposite terminal thereof through a conductor 262 to a central terminal 260 of the selector switch section 138.

Lag Switch Section for Storage Cycle

The selector switch section 138 includes a switch arm 298 angularly positioned so as to selectively close switch contacts 261, 262, 263, 264 and 265 which in turn are connected to one terminal of normally open lag microswitches 271, 272, 273, 274 and 275 by conductors 281, 282, 283, 284 and 285, respectively, while an opposite terminal of each of these normally open microswitches is connected by a common conductor 330 to ground 70 and in turn through the grounded conductor 86 to the negative terminal of the battery 84. The switch arm 298 may be angularly positioned by operation of the knob 131 through the common control axle 140.

Lead Switch Section for Retrieve Cycle

The lead switch section 255 is connected to the switch contact 252 through a fork retrieve indicator light 286 by a conductor 288 leading from switch contact 252 to one terminal of the indicator light 286. The light 286 in turn is serially connected from an opposite terminal thereof to a central terminal 290 of the selector switch section 139 by a conductor 292. It should be noted that the central terminals 132, 194, 260 and 290 of selector switch 130 include angularly positioned switch arms 294, 296, 298 and 300, respectively, each electrically connected to its corresponding central terminal and angularly positioned by the common control shaft 140 upon operation of the main control knob 131 by the operator.

The selector switch section 139 includes the switch arm 300 angularly positioned so as to selectively close switch contacts 301, 302, 303, 304 and 305 which in turn are connected to one terminal of normallly closed microswitches 311, 312, 313, 314 and 315 through conducturs 321, 322, 323, 324 and 325, respectively, while an opposite terminal of each of these normally closed microswitches is connected by a common conductor 328 to ground 70 and in turn through the grounded conductor 86 to the negative terminal of the battery 84. Thus, the normally closed lead switches 311 to 315 and normally open lag switches 271 to 275 are connected to ground potential 70 through conductor 328 and 330, respectively.

Operation

In the operation of the system, assuming that the fourth rack level, which is also assumed to be twenty-five feet above floor level, is selected to load a pallet, the operating knob 185 for the axle 180 of the cycle selector switch 170 is rotated from the position shown by FIG. 4, to the first position of the angularly positioned switch arms 244 and 246 to connect central terminal 172 of the selector switch 170 to switch contact 181 and central terminal 242 of the selector switch 178 to switch contact 251. This first step sets the lift storage cycle of the forks. The selector lift rotary switch 130 is then adjustably set by the main control knob 131 and through the common axle 140 to the fourth setting position of the switch arms 294, 296, 298 and 300 to connect central terminals 132, 194, 260 and 290 to switch contacts 144, 204, 264 and 304, respectively.

Before the operation of the shelf selector system 10, the microswitches 50, shown by FIGS. 1, 2 and 3, are adjusted in a longitudinal direction of the carrier 14 on the tie rods 24. The location of each set of microswitches 50 which comprise microswitch sets: 146 to 150; 211 to 215; 271 to 275; and 311 to 315, shown by FIG. 4, are located circumferentially of the cam sleeve 36 with each set extending longitudinally of the carrier on a pair of tie rods 24.

Calibration is then made between the longitudinal location of the switches on the tie rods 24 and the preselected rack shelf level pattern, which coincides with the fork height pattern. It should be noted, here again, that the rack shelf level pattern must be consistent at one setting but the shelf levels need not be evenly spaced.

Adjustable Carrier Assembly to Set Memory Means

It should also be noted that the carrier assembly apparatus 14 of FIGS. 1 and 2 has the frame plate 20 concentrically mounted at the shaft or bushing 23 so that it may be pivotally shifted from one fixed angular position to a second fixed angular position about the shaft 23 by suitable operating means. Thus the carrier 14 may be effectively rotated or selectively angularly positioned as a whole on the shaft or bushing 23 so that the frame plates 20 and 22 of the carrier 14 are angularly shifted approximately 15° relative to the supporting end plates 21 and 29 of the frame structure 12 when the forklift operator moves from the lag or storage cycle to the lead or retrieve cycle.

The described angular positioning of the adjustable carrier assembly apparatus 14 from the one angular position to the other angular position may be effected by suitable positioning or motor operated means.

As shown in FIG. 4, the angular positioning or motor operated means may be of a type including a reversible D.C. Motor 400 having suitable control windings 402 and 404 selectively energizable for effecting rotation of a rotor element 406 of the motor 400 in a clockwise or counterclockwise direction. The selective energization of the control windings 402 or 404 may be separately controlled by the operator or, as shown by FIG. 4, the control winding 402 may be connected at one end by an electrical conductor 408 to the switch contact 251 of the cycle selector switch section 178, while the control winding 404 may be connected at one end by an electrical conductor 410 to the switch contact 252 of the switch section 178. The opposite ends of the control windings 402 and 404 may be connected by a common conductor 412 to ground potential 70.

The rotor element 406 of the reversible D.C. Motor 400, as shown by FIGS. 1 and 4, may be connected by a suitable linkage 414 and coupling pins 416 and 418 to the frame plate 22 of the carrier assembly apparatus 14 so as to angularly position the carrier assembly apparatus 14 in one sense about the shaft 23 to effect a storage cycle upon the operator positioning the switch arm 246 of the cycle selector 178 so as to close the switch contact 251 to effectively energize the control winding 402. The carrier assembly apparatus 14 may be angularly positioned in an opposite sense to effect a retrieve cycle upon the operator selectively positioning the switch arm 246 so as to close the switch contact 252 to effectively energize the control winding 404 of the motor 400.

Thus the carrier assembly apparatus 14 may be selectively positioned in one angular sense to effect the location of the selected rack shelf in a storage pattern and in the other alternate angular sense to effect a different location of the rack shelf in a discharging or retrieve pattern.

In the storage pattern, the switch arm 246 is selectively adjusted by the operator-operative knob 185 so as to close switch contact 251 of the Cycle Selector Switch Section 178 to energize the control winding 402 of the motor 400 and render effective the operation of the Lag Switch Section 254 for the storage cycle.

Should it be desired that the operating means provide an angular positioning of the adjustable carrier memory apparatus 14 in the opposite angular sense to provide the retrieve pattern, the switch arm 246 may be thereupon selectively adjusted by the operator-operative knob 185 so as to close switch contact 252 of the Cycle Selector Switch Section 178 to energize the control winding 404 and render effective the operation of the Lead Switch Section 255 for the retrieve cycle.

In effecting the storage pattern, the angular positioning of the adjustable carrier assembly 14 by such operating means in the one angular sense relative to the supporting structure 12 will be in such an angular relation to that of the lead screw 26 that the cam selector section means 16 under the biasing force of the springs 40 will be moved longitudinally on the lead screw 26 in a lagging sense or direction indicated by the arrow 38.

The resultant adjustment of the cam selector section means 16 will be such as to require the forks of the forklift F to be raised to a greater height than the preset level of the selected rack shelf so as to better effect the storage operation of the forks F in placing a pallet on the rack shelf.

Conversely, in effecting the retrieve pattern, the angular positioning of the adjustable carrier memory assembly 14 by the operating means in the aforedescribed opposite angular sense relative to the supporting structure 12 will be in such an opposite angular relation to the lead screw 26 that the cam selector section means 16 will be moved longitudinally on the lead screw 26 in a leading sense or direction indicated by the arrow 46 in opposition to the biasing force of the springs 40.

The resultant adjustment of the cam selector section means 16 will be such as to require the forks of the forklift F to be raised to a lower height than that of the preset level of the selected rack shelf so as to better effect the retrieve operation of a pallet from the rack shelf onto the forks F.

The foregoing adjustment of the setting of the carrier memory assembly means 14 provides an effective means to compensate for the height the forks have to be raised in the storage cycle which is higher than the height of the forks in the retrieve cycle of operation. That is, in the storage of a rack shelf from the forks, the forks have to be raised above the rack shelf height to enter into the shelf, whereupon the operator may then manually control the forklift F so as to lower the forks so as to place the load onto the shelf and then retract the forklift F from the shelf. In unloading or retrieving a pallet from the rack shelf, the forks have to enter into the shelf just under the pallet on the rack shelf, and thereafter the operator may then manually control the forklift F so as to move upwardly to remove the pallet off the shelf onto the forks and then retract the forklift F out of the shelf, carrying the pallet. Therefore, when cycle selector switch 170, shown by FIG. 4, is set to the first position for the storage operation and the selector lift switch 130 is set to the fourth position, the storage operation is ready to begin to effectively load a pallet from the fork onto the fourth shelf.

On-Off Indicator

In this position of the cycle selector switch 170 and selector lift switch 130, the push button 114 is depressed by the forklift operator to connect switch contacts 116 and 118 momentarily. The holding relay 88 will then be energized to direct current from the battery 84 through conductors 82, 234, 238 and 186, past the now closed terminals 181 and 172 of switch section 176, through conductor 174 and 164 to illuminate the "on-off" indicator light 166 to show that the system is operating.

The current will also be directed through conductors 160 and 128 and holding relay coil 124 through conductor 112 past the now closed switch contacts 104 and 102, through conductors 108 and 134 to the central terminal 132 of the selector switch section 136. Since the switch arm 294 is on the fourth setting, it will connect terminals 132 and 144 of switch section 136 to direct the current through conductor 154 and the normally closed microswitch 149 and conductor 226 to ground potential 70 to complete the closed circuit to the battery 84.

Since current is flowing through coil 124 of the holding relay 88, the relay will remain locked to direct current from the battery 84 through conductors 234, 238 and 186 through the switch arm 244 which is now in the first positionclosing switch contact 181 to terminal 172 through conductors 174, 160 and 98 to the now closed switch contacts 96 and 90 of the holding relay 88, through conductor 94 and through coil 92 and conductor 95 to ground 70 to hold the power relay 78 closed, permitting current from the battery 84 to be applied through conductor 82 to the now closed switch contacts 80 and 74 through conductor 76 to energize the motor-pump M to raise the forks F.

The motor-pump M will be energized continuously to drive the forks F upwardly and thereby draw out the tape T to rotate drum 28 which in turn rotates the coaxial pinion gear 30 which meshes with gear 32 to rotate lead screw 26. The lead screw 26 in turn will move the cam sleeve 36 longitudinally of the carrier 14 in the direction shown by arrow 46 synchronous with the position of the forks F.

Shelf-Level Indicator

When the cam 36 contacts the cam follower of the fourth switch 149 it will open the switch 149 to deactivate the holding relay 88 and thus open the power relay 78 to stop the motor-pump M. At this location the forks of the forklift will be located slightly above the fourth shelf station. This will be indicated by resultant energization of the level indicator light 190. That is, when the forks are moved by the forklift operator to just above the fourth shelf, the tape T will be drawn out to rotate the drum 28 to move the cam 36 in the direction shown by arrow 46 in FIG. 1 contacting the cam follower of the normally open switch 214 to close it. That is, current will flow from the battery 84 through conductors 82, 234, 238 and 192 to illuminate the light 190. The current will continue through conductor 198 to the center terminal 194 and through switch arm 296, switch contact 204 and conductor 224 to the now closed switch 214 and through conductor 228 to ground potential 70. Storage Indicator The fork storage cycle indicator light 256 will receive current from the battery 84 through conductors 234 and 240 through the switch arm 246 which is now also in the first position, past the central terminal 242 and switch contact 251, through conductor 258 to illuminate the light 256. Since section 138 of the selector switch 130 is in the fourth position the current will continue through conductor 262, through switch arm 298, past center terminal 260 and switch contact 264, through conductor 284, through the now closed, normally open lag switch 274, through conductor 330 to ground 70. The switch 274 being closed by the cam 36 contacting the cam follower of the switch 274, the forks are now located just above the fourth rack shelf at which time the forks F can be moved horizontally into the shelf under manual control of the operator and the pallets lowered thereon.

Upon the forks being lowered under control of the operator, the tape T will be released by the forks to permit the springs 40 to act upon the sleeve cam 36 to retract it in the direction shown by arrow 38 to close the switch 274 and remove the current leading to the fork load indicator light 256. Since the light 256 is now off, the forklift operator will know that the forks are unloaded and may thereupon operate the forks to retract the forks out of the shelf.

Retrieve Indicator

To unload or retrieve the pallet from the fourth shelf, the cycle selector switch 170 is set at its second position to connect center terminals 172 and 242 to switch contacts 182 and 252, respectively. In this position of the cycle selector switch 170, the lead switches 255 will be set for operation, while the control winding 404 of the motor 400 will be energized for rotating or angularly positioning the carrier 14 in relation to the lead screw 26 about 15°. Such adjustment may be effected by suitable operating means to reset or to position the cam 36 so as to effectively position the forks F to a little lower position in the retrieve cycle than that of the storage cycle so as to be directly in line with the lower portion of the pallet.

Therefore, in the retrieve operation, the forks F can be located by the shelf selector 10, and thereafter the forklift F may under manual control of the operator be inserted under the pallet so as to pick up the pallet, move upwardly and be retracted outwardly by the forklift operator to unload the pallet from the shelf. The forks F under control of the operator may then be lowered and the shelf selector system 10 will work backwards, moving the cam 36 in the direction shown by arrow 38 under the biasing force of the springs 40 to the starting position.

Second Embodiment of the Invention

The heretofore described control device of FIG. 1 relates to subject matter disclosed and claimed in my said copending application Ser. No. 849, in respect to which the present application has been filed as a continuation-in-part.

Figure 5:
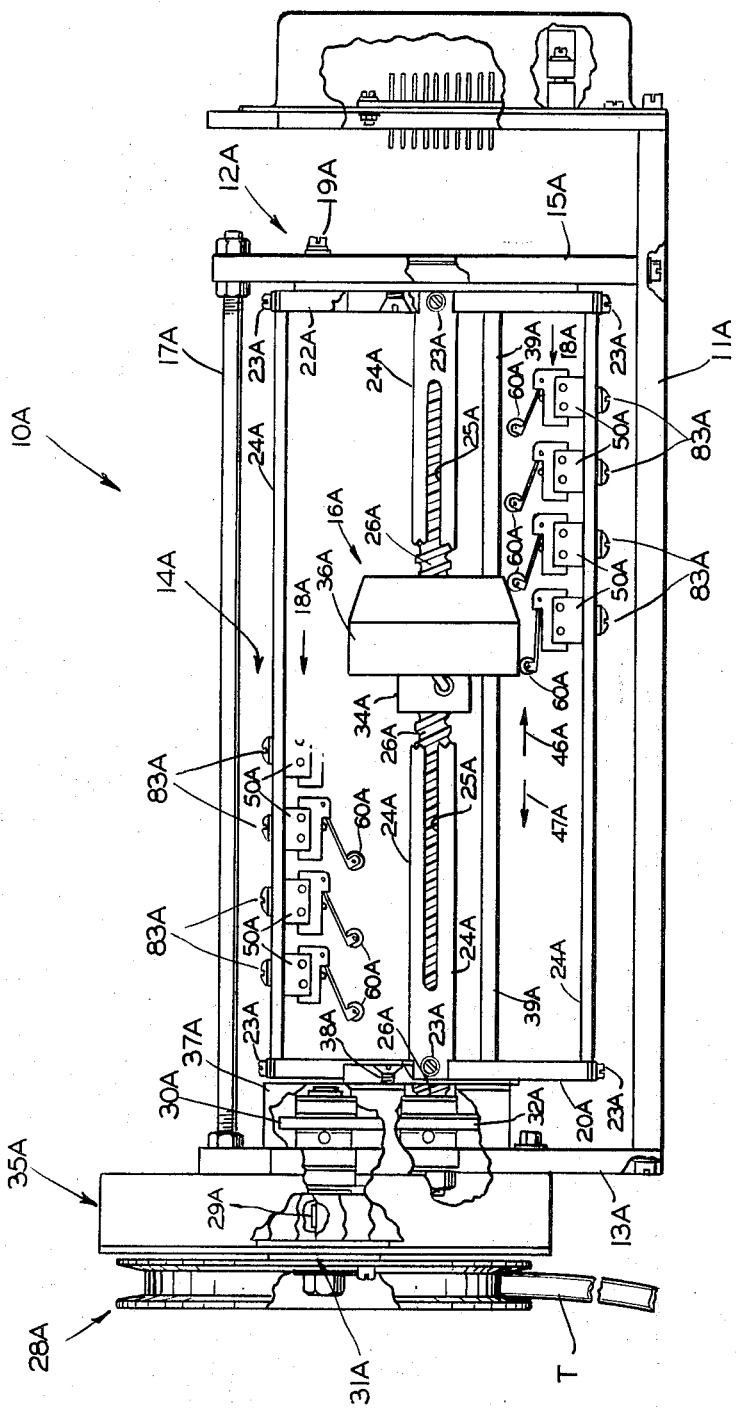
FIG. 5 is a side sectional view of another and preferred form of control device including a carrier assembly apparatus for the automatic shelf selector system of the present invention.

Subject matter of the invention, which is common to the control device of FIG. 1, is illustrated in the second embodiment of the invention shown by FIG. 5.

Claims to the control device of FIG. 5 are directed to those features of this view which are common to the control device of FIG. 1.

Control Device

In describing the control device of FIG. 5, parts corresponding to those of FIG. 1 have been identified by like numerals bearing the suffix "A".

Figure 15:
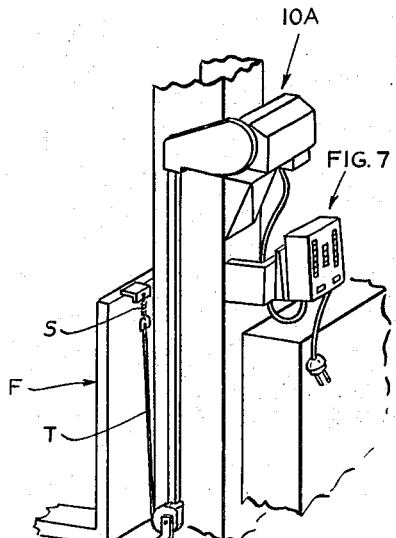
FIG. 15 is a fragmentary view of a forklift illustrating the arrangement of a control device including a carrier assembly apparatus as shown by FIG. 5 and the control console of the split level selector type of FIG. 7 in an operator-operative relation on the forklift.

Referring now to FIG. 5, there is shown a control device 10A for a shelf selector system for automatically positioning loading devices such as the forks F of forklifts, as shown by FIG. 15, to effect a storage or retrieval of pallets at preselected rack shelves.

The control device 10A comprises a frame structure 12A having a base plate 11A and end plates 13A and 15A secured to the base plate 11A. Tie rods 17A secure the end plates 13A and 15A at the upper ends thereof. A carrier assembly apparatus 14A comprising a multiple position cam selector means 16A and a sensor means 18A is mounted between the end plates 13A and 15A. The carrier apparatus 14A includes a pair of spaced carrier frame plates 20A and 22A. The frame plate 22A is secured to the end plate 15A of the frame structure 12A by bolt 19A. The frame plates 20A and 22A are supported by a plurality of carrier tie rods 24A which are, in turn, secured by bolts 23A at the opposite ends thereof to the frame plates 20A and 22A of the carrier assembly 14A. The tie rods 24A are of slightly different form from that of the square tie rods 24 of FIG. 3 in that each of the tie rods 24A of FIGS. 5 and 6 is provided with a longitudinal slot 25A for mounting suitable microswitches 50A on the respective tie rods 24A for operation by the cam selector means 16A, as hereinafter explained.

Figure 13:
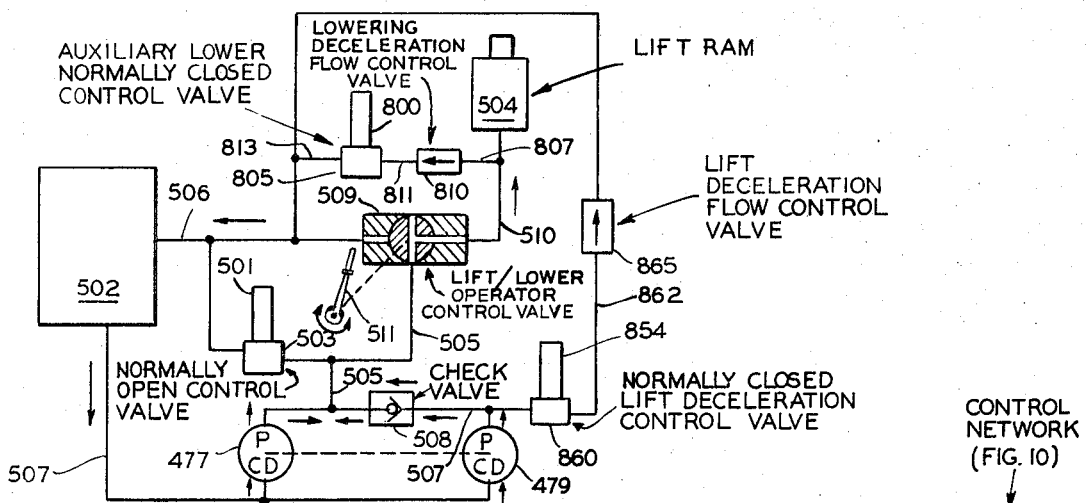
FIG. 13 is a diagrammatic illustration of a conventional type hydraulic control system for a forklift which may be operatively controlled by an electrical control system of a type shown by FIG. 14 and with which the electrical control systems of the present invention shown by FIGS. 10, 11 and 12 may be operatively connected.
Figure 14:
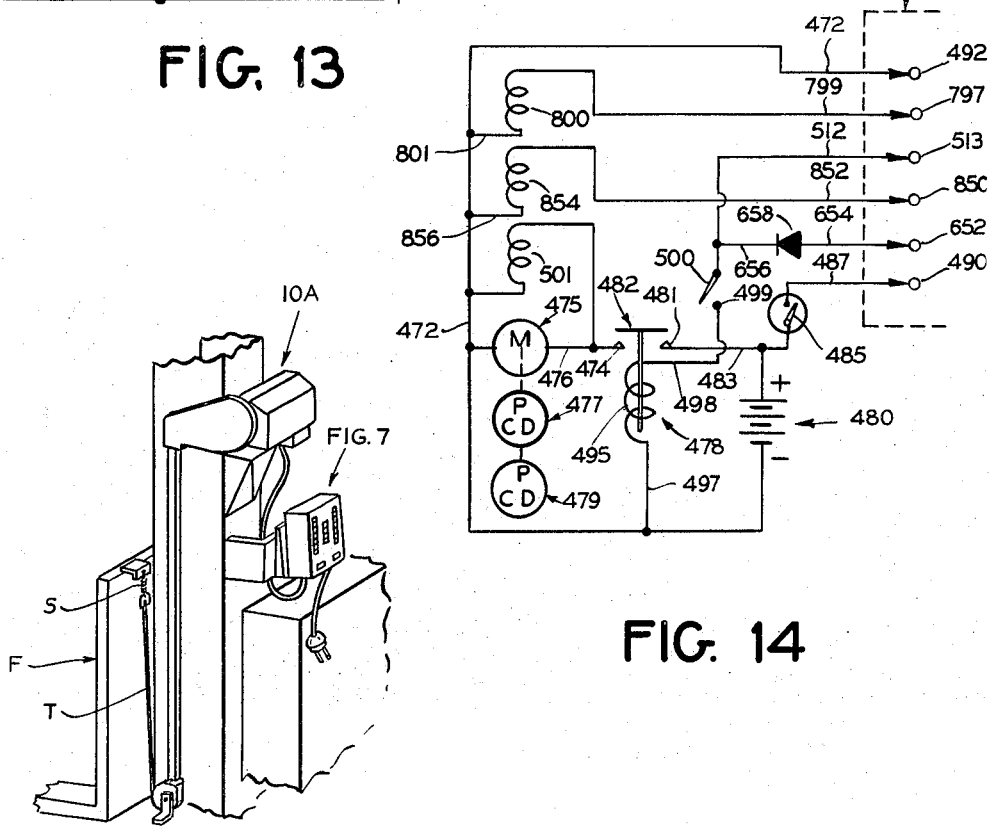
FIG. 14 is a diagrammatic illustration of a conventional type electrical control system for the hydraulic control system of FIG. 13 and with which the electrical control systems of the present invention shown by FIGS. 10, 11 and 12 may be operatively connected.

The cam selector means 16A includes a lead screw 26A which is shown in FIG. 5 immediately behind one of the tie rods 24A on which suitable microswitches 50A may be mounted, but are not shown, and a part of which tie rod 24A has been broken away so as to better show the cam selector means 16A and lead screw 26A positioned immediately behind the broken away tie rod 24A. The lead screw 26A is rotated by a pulley or drum 28A which, as shown by FIG. 5, is, in turn, rotated by a spring loaded tape or cable T connected by a coupling spring S to a fork F of a forklift as shown by FIG. 15. The fork F may be driven upwardly by a suitable actuator or lift ram which may be powered in a conventional manner by a motor pump unit such as shown in FIGS. 13 and 14 and conversely retractable by spring action of a power spring 29A, shown in FIG. 5, wound about a hub portion 31A of the drum 28A and effective upon the fork F being returned downwardly to cause a counter-rotation of the drum 28A to wind the tape T onto the drum 28A. The power spring 29A, as shown by FIG. 5, is mounted in a power spring housing 35A mounted on the end plate 13A of the frame structure 12A.

It will be seen that as the drum 28A is rotated in one sense or the other, there is driven a coaxial pinion gear 30A meshing with a lead screw gear 32A which is coaxially engaged with the lead screw 26A for driving the same. The gears 30A and 32A are rotatably mounted in a gear housing 37A secured to the end plate 13A of the frame structure 12A and in turn bolted at 38A to the end plate 20A of the carrier apparatus 14A. Riding longitudinally on the lead screw 26A is a lead screw nut 34A which is formed integral with a cam element 36A which, in turn, is slidably mounted on a rod 39A connected at opposite ends to the frame plate 20A and 22A of the carrier assembly 14A so as to permit longitudinal movement of the cam element 36A on the rod 39A upon the nut 34A moving longitudinally on the lead screw 26A upon rotation of the lead screw 26A, while the rod 39A prevents angular movement of the cam element 36A relative to the frame plates 20A and 22A of the carrier assembly apparatus 14A.

Therefore, as heretofore explained with reference to the form of the invention of FIGS. 1–4, as the fork F is driven upwardly by the motor pump driven actuator or lift ram, tape T is drawn out to rotate the drum 28A which in turn rotates the lead screw 26A to drive the nut 34A and the cam element 36A in a direction shown by the arrow 46A of FIG. 5 when the system is extended in the lift cycle of the forklift, while the tape T is retracted by the action of the power spring 29A to move cam 36A in an opposite direction as shown by the arrow 47A of FIG. 5, when the system is retracted in the lowering cycle of the forklift.

The sensor section 18A includes a plurality of microswitches 50A mounted on the several tie rods 24A and each of which may be mounted for longitudinal adjustment on one of the tie rods 24A by means of a leaf spring fastening bracket indicated generally by numeral 52A, as shown in detail by FIG. 6. Each of the brackets 52A includes a conventional type microswitch 50A embodied in a block 54A of a suitable moldable electrical insulation material and including in the microswitch a switch actuating button 55A operable by a cam follower arm 56A having a cam follower roller 60A provided at the free end thereof. The cam roller 60A is arranged to contact a cam surface of the cam element 36A for selective actuation of the button 55A controlling the microswitch 50A as the cam element 36A progresses longitudinally along the lead screw 26A. Opposite terminals 61A and 63A of the switch 50A may be provided with suitable electrical conductors leading into the electrical network to be controlled by the microswitch 50A. Certain of these microswitches may be of a type normally biased to an open circuit position, while others of the microswitches may be of a type biased to a closed circuit position depending upon the operating characteristics required of each of the microswitches, as shown diagrammatically by FIG. 10.

The switch block 54A, as shown by FIG. 6, is clamped between plates 65A and 67A and secured in position by rivets 69A which in turn secure to the plate 67A an arm 71A of an angular bracket 73A having another arm 75A extending at a right angle to the arm 71A. The arm 75A may be positioned between opposite arms 77A and 79A of a leaf spring clamp 81A.

The leaf spring clamp 81A is secured in position on the arm 75A and on the tie rod 24A by a fastening bolt 83A which has a screw-threaded stem portion 84A extending through the longitudinal slot 25A in the tie rod 24A and through openings 85A and 86A provided in the arms 79A and 75A, respectively, with the screw-threaded stem portion 84A of the bolt 83A being screw-threadedly engaged in a screw-threaded opening 88A provided in the arm 77A of the leaf spring clamp 81A. Such arrangement permits the fastening bolt 83A to be tightened in the screw-threaded opening 88A so that the arm 75A of the bracket 73A may be clamped between the arms 77A and 79A of the leaf spring clamp 81A so as to effectively mount the microswitch 50A on the tie rod 24A. By longitudinally positioning the bracket 52A along the tie rod 24A, an adjustment may be made for the preselection of the fork height of the forklift in relation to the height of the rack shelves, as heretofore explained, with reference to the earlier form of the invention of FIGS. 1–4.

In the control device 10 of FIGS. 1–4, the carrier assembly apparatus 14 is pivotally mounted at 23 in the frame structure 12 so that it may be angularly positioned in relation to the lead screw 26 by operation of the motor 400, whereupon the position of the cam section 16 may be selectively varied in relation to the shelf level switch 50 in alternate leading or lagging senses. Thus one shelf level switch section of FIG. 1 may alternately serve to provide the double function, respectively, of the retrieve and storage cycles of operation.

Electrical Control Network

Figure 10:
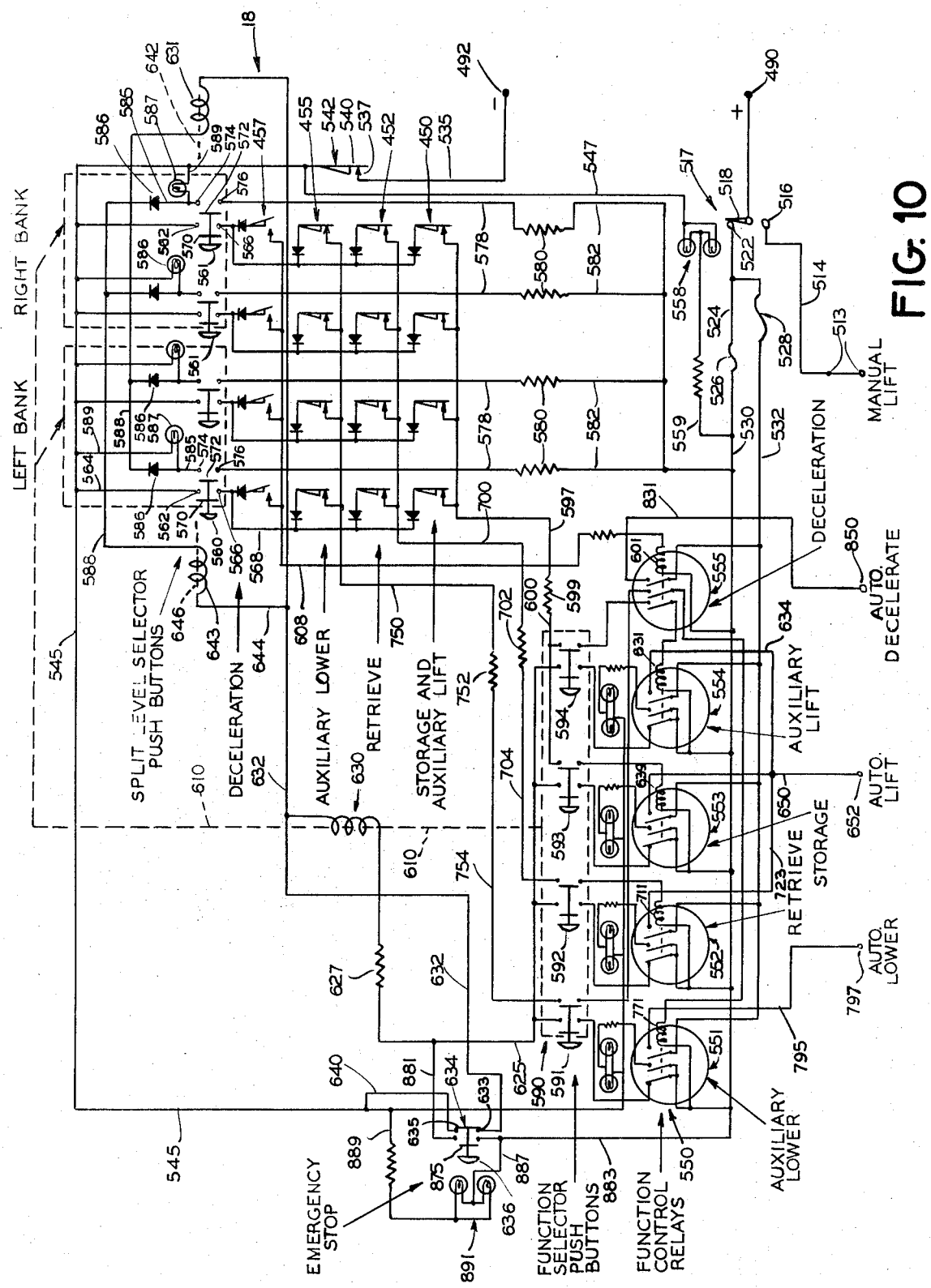
FIG. 10 is a schematic wiring diagram of a split level electrical control system embodied in a preferred form of automatic shelf selector system which may include a carrier assembly apparatus of the type illustrated by FIG. 5 and a control console of the split level selector type illustrated by FIG. 7; and with relay elements indicated at FIG. 12.

In the form of the invention of FIG. 5, instead of pivotally mounting the carrier assembly apparatus 14A in the frame structure 12A, it is fastened in the position shown in the frame structure 12A and, instead of a single switch section for effecting both the storage and retrieve functions, there is provided in the control network, as shown by the wiring diagram of FIG. 10, the shelf level switch section 18A. The switch section 18A may include one switch section 450 of a plurality of microswitches 50A suitably positioned on the tie bars 24A in a sense lagging the adjusted position of the cam 36A to effect the storage cycle and auxiliary lift functions and another switch section 452 of a plurality of microswitches 50A suitably positioned on the tie bars 24A in a sense leading the adjusted position of the cam 36A to effect the retrieve cycle. Each of the switches 50A of the switch sections 450 and 452 are of a type normally biased to a closed switch contact position, as shown diagrammatically by FIG. 10, with the switches of the section 450 being positioned so as to be selectively opened by the cam 36A at a position corresponding to a predetermined position of the fork F above a selected shelf at which to initiate the storage function or terminate an auxiliary lift in the retrieve function, while switches of the section 452 are positioned so as to be selectively opened by the cam 36A at a position corresponding to a predetermined position of the fork F below a selected shelf at which is initiate the retrieve function.

There are also provided in the shelf level switch section 18A additional sections 455 and 457 of a plurality of microswitches 50A for effecting automatic lower and automatic deceleration functions, respectively, as hereinafter explained. Each of the microswitches 50A of the section 455 is of a type normally biased to a closed switch contact position while each of the microswitches 50A of the section 457 is of a type normally biased to an open switch contact position, as shown diagrammatically by FIG. 10, with the switches of the section 455 being so positioned as to be selectively opened by the cam 36A at a position corresponding to a predetermined position of the fork F below a selected shelf at which to terminate an auxiliary lowering of the fork F in a storage function, while the switches of the section 457 are positioned so as to be selectively closed by the cam 36A over a range beginning at a predetermined point of, for example, from six to twelve inches before the selected shelf, and over which range there is effected in the raising of the fork F a deceleration or decrease in the lift speed and in the lowering of the fork F there may be effected over such range a deceleration or decrease in the speed of lowering the fork F.

The concept embodied in the control device 10A of multiple sections 450, 452, 455 and 457 of such microswitches 50A suitably positioned on the several tie bars 24A, as shown by FIG. 5, and explained with reference to FIG. 10, is common to the concept of the early form of the control device 10 having multiple sections of such microswitches 50 suitably positioned on the tie bars 24, as shown by FIG. 1 and explained with reference to FIG. 4.

However, the electrical control network of FIG. 10 with which the switch sections 450, 452, 455 and 457 of the control device 10A of FIG. 5 are shown in an operative relation is somewhat different in mode of operation from the control network of FIG. 4 with which the multiple switch sections of the control device 10 of FIG. 1 are shown in operative relation. In order that the mode of operation of the control device 10A in the control network of FIG. 10 may be more clearly understood, a typical hydraulic control system of a conventional type for a forklift has been illustrated at FIG. 13, while an electrical control system also of a conventional type for effecting operation of the hydraulic control system of FIG. 13 has been illustrated by FIG. 14, together with the electrical input and output connections for operatively connecting the electrical control network of FIG. 10 and the control device 10A of FIG. 5, as hereinafter explained.

Referring now to the electrical control system of FIG. 14, a motor 475 drives a main lift pump 477 and an auxiliary lift pump 479, both pumps being of a constant delivery type. The motor 475 is electrically connected at one terminal to a conductor 472 leading from a negative terminal of a source of electrical energy or battery 480. The motor 475 is further electrically connected at an opposite terminal by a conductor 476 to a switch contact 474 which is part of a lift control relay 478 having an opposite switch contact 481 spaced from the switch contact 474 and controlled by a relay switch element 482. The switch contact 481 is connected by a conductor 483 to the positive terminal of the battery 480. The positive terminal of the battery 480 is also connected by the conductor 483 to an operator-operative master control switch 485 and therethrough to an output conductor 487 leading to a positive input terminal 490 of the control network of FIG. 10. The conductor 472 leads from the negative terminal of the battery 480 to a negative terminal 492 of the control network of FIG. 10.

The lift control relay 478 includes an electromagnetic winding 495 connected at one terminal by a conductor 497 to the conductor 472 leading to the negative terminal of the battery 480, while the opposite terminal of the winding 495 is connected by a conductor 498 to a switch contact 499 controlled by a switch arm 500 of an operator-operative lift control switch. Upon the switch arm 500 being positioned to close switch contact 499 and the electromagnetic winding 495 being thereupon energized, the relay switch element 482, normally biased to an open contact position, will then be actuated by the magnetic force of the energized relay winding 495 to a position closing the relay contacts 474 and 481.

The closing of the relay contacts 474 and 481 will in turn effect energization of the motor 475, and an electromagnetic control winding 501 connected across the motor 475 with one terminal of the winding 501 being connected to the negative conductor 472 and the opposite terminal connected to the then energized input conductor 476. The energized motor 475 then serves to drive the main and auxiliary pumps 477 and 479, respectively, so as to supply a hydraulic fluid medium from a reservoir tank 502 under pressure to the hydraulic control system of FIG. 13, as hereinafter explained, while the energized control winding 501 simultaneously actuates a normally open drift control valve 503 to a valve closed position. Such closure of the drift control valve 503 upon energization of the control winding 501 serves to prevent hydraulic pressure medium from being diverted from the lift ram 504 through the otherwise normally open drift control valve 503 leading from an output conductor 505 of the main and auxiliary pumps 477 and 479, respectively, to a return inlet conduit 506 to the reservoir 502.

Accordingly, upon the foregoing energization of the motor 475 and the control winding 501 of the drift control valve 503, hydraulic pressure medium will be drawn from the the reservoir 502 through an outlet conduit 507 by the main and auxiliary pumps 477 and 479 driven by the motor 475 and supplied under pressure by the main pump 477 directly to the output hydraulic pressure conduit 505, while the auxiliary pump 479 will supply additional hydraulic pressure medium through an output conduit 507 and a unidirectional check valve 508 to the output hydraulic pressure conduit 505.

The hydraulic pressure medium thereby supplied to the conduit 505 will be in turn applied through a three-way operator-operative control valve 509, which may be of a conventional type. The control valve 509, as shown by FIG. 13, is in a lift control adjusted position so that hydraulic pressure medium applied at conduit 505 is directed by the control valve 509 to a conduit 510 leading to the lift ram 504, so as to effect operation of the lift ram 504 in a sense to raise the fork F of FIG. 15. The ram 504 in turn may position the fork F of the forklift, shown by FIG. 15, so as to cause the tape T to effect rotation of the drum 28A to drive the lead screw 26A to position the cam 36A in the sense indicated by the arrow 46A of FIG. 5 upon the raising of the fork F by the operation of the lift ram 504. However, upon a withdrawal of the hydraulic pressure medium applied to the lift ram 504 by operation of the hydraulic control system of FIG. 13, as hereinafter explained, causing a lowering of the ram 504, the power spring 29A will effect a counter-rotation of the drum 28A and lead screw 26A to position the cam 36A in the opposite sense indicated by the arrow 47A of FIG. 5.

Such withdrawal of the hydraulic pressure medium from the ram 504 may be effected by the operator manually positioning a control arm 511 operably connected to the three-way valve 509. The operator may adjust the arm 511 so as to angularly position the three-way valve 509 from the position shown in FIG. 13 to a position selectively connecting both of the conduits 505 and 510 to the return conduit 506 leading to the inlet to the reservoir 502 or, alternatively, the conduit 505 only may be connected through the valve 509 to the return conduit 506, or only conduit 510 may be connected through the angularly positioned valve 509 to the return conduit 506 so as to selectively withdraw the hydraulic pressure medium from the ram 504. Thus the operator, by suitable manual adjustment of the valve 509, may control the lowering of the lift ram 504 and thereby the fork F. Moreover, the operation of the lift ram 504, as hereinafter described, may be automatically or manually controlled through suitable operator-operative means provided in the control network of FIG. 10.

In this connection, it may be noted that the operator-operative switch arm 500 of the lift control switch of FIG. 14 is connected by a conductor 512 to a manual lift output terminal 513 of the control network of FIG. 10. The terminal 513 is in turn connected by a conductor 514 to a switch contact 516 of an operator-operative on-off control switch 517 having a switch arm 518 selectively operable in cooperative relation with the switch contact 516 and a switch contact 520. The switch arm 518 is connected by a conductor 520 to the positive input terminal 490 and is normally biased to the position, shown by FIG. 10, in which the switch arm 518 is in an open relation with the switch contact 516, while closing the switch contact 522. The switch contact 522 is in turn connected by a conductor 524 leading through fuse 526 to a power line 530 for the control network of FIG. 10 and through fuse 528 to a power line 532 for providing electrical outputs to operate the electrical control system of FIG. 14, under control of the several function relays of the network of FIG. 10, as hereinafter explained.

The switch arm 518 may be selectively positioned by the operator to open the switch contact 522 and close the switch contact 516 so as to thereby effectively connect the positive terminal of the battery 480 to the operator-operative lift control switch arm 500 of FIG. 14. The control switch arm 500 may then be manually positioned to open and close the switch contact 499 so that energization of the electromagnetic winding 495 of the lift control relay 478 may be manually controlled by the operator. Such energization of the relay winding 495 will in turn cause the motor 475 to be energized so as to effectively drive the main and auxiliary lift pumps 477 and 479 for supplying hydraulic fluid medium under pressure to the hydraulic control system of FIG. 13 for positioning the lift ram 504 under manual control of the operator, as hereinafter explained.

However, upon the switch arm 518 of the on-off control switch 517 of FIG. 10 being returned by the operator to the position shown in which the switch arm 518 closes the switch contact 522, the control network of FIG. 10 is then effectively connected to the positive terminal of the battery 480 of FIG. 14, while the negative terminal of the battery 480 is connected through the conductor 472 to the negative terminal 492 of the control network of FIG. 10. The terminal 492 is in turn connected by a conductor 535 to a contact 537 of a safety switch or microswitch 542 having a switch arm 540 normally biased to a position to close the contact 537.

The switch arm 540 of the safety switch 542 is in turn connected to conductors 545 and 547. The conductor 545 leads to the fork level sensor sections 450, 452, 455 and 457 and is selectively connected to one of a plurality of microswitches in each fork level sensor section for selective operation of the function control relays 550. The conductor 545 also leads to lamps 543 for indicating operation of the function control relays 551, 552, 553 and 554, as hereinafter explained. Moreover, the conductor 547 leads to terminals of indicator lamps 558 having opposite terminals connected through a resistor and a conductor 559 to the power line 530 for energizing the control network of FIG. 10. The lamps 558 upon energization indicate to the operator that the control network of FIG. 10 is effectively energized for automatic operation, as upon the on-off switch 517 being in the position shown by FIG. 10, with the switch arm 518 closing switch contact 522.

Upon the control network of FIG. 10 being so effectively energized and accordingly in an automatic operating condition, there is provided a plurality of push button control switches 560 and 561 for selectively conditioning the microswitches of the sensor sections 450, 452, 455 and 457 for such automatic operation. In a split level selector control network such as shown by FIG. 10 with a control panel as shown by FIG. 7, there are provided push button control switches 560 of a left bank of push buttons and push button control switches 561 of a right bank of push buttons. Each of these push button control switches 560 and 561 is of a conventional type normally biased to an open position. Each one of the control switches 560 and 561 is individual to one of the microswitches in each of the fork level sensor sections including the deceleration switch section 457, auxiliary lower switch section 455, retrieve switch section 452 and storage and auxiliary lift switch section 450.

Each of the push button control switches 560 and 561 may be of like structure having a switch contact 562 connected by a conductor 564 to the negative conductor 545 while an opposite switch contact 566 is connected by a conductor 568 to the negative terminal of a suitable diode having a positive terminal connected to a terminal of a normally open microswitch of the switch sections 457. The conductor 568 is further connected to the negative terminal of other diodes having a positive terminal connected to a terminal of one normally closed microswitch of each of the respective switch sections 455, 452 and 450. Each of the push button control switches 560 and 561 has a switch element 570 which may be selectively actuated by the operator from a normally open position relative to the switch contacts 562 and 566 to a position closing the switch contacts 562 and 566 simultaneously with a switch element 572 of the push button control switch being actuated from a normally open position relative to switch contacts 574 and 576 to a position closing the switch contacts 574 and 576. The switch contact 576 is connected by a conductor 578 through a resistor element 580 and a conductor 582 to the positive power line 530 of the control network of FIG. 10, while the switch contact 574 is connected by a conductor 585 to a terminal of an indicator lamp 587 having an opposite terminal connected by a conductor 589 to the negative conductor 545 of the control network.

Thus upon one of the push button control switches 560 or 561 being selectively actuated by the operator to cause the switch element 570 to close the switch contacts 562 and 566 to selectively render effective for operation the microswitch controlled thereby in the respective fork level sensor switch sections 457, 455, 452 and 450, an indicator lamp 587 individual to the selectively operated push button control switch 560 or 561 will be energized. This will be caused by the corresponding switch element 572 of the operator-actuated push button control switch 560 or 561 simultaneously closing switch contacts 574 and 576 so that the resulting energized lamp 587 may indicate to the operator the microswitch of each fork level sensor switch section which has been selectively conditioned for operation.

Moreover, it should be noted that while only two of the left bank push button control switches 560 and two of the right bank push button control switches 561 are shown by way of illustration in FIG. 10, additional push button control switches similarly operative may be provided in the left and right banks 560 and 561, as shown by FIG. 7.

The push button control switches of each bank includes mechanical latching means of conventional type effective upon the actuation of the first of the push button control switches of one bank of switches to prevent actuation of any other of the push button control switches of that one bank, while the energization of a lock solenoid of the other bank effected by the actuation of the first of the push button controls of the one bank of push button controls, as hereinafter explained, will thereupon render operatively effective the mechanical latching means of the push button control switches of the other bank so as to prevent a subsequent actuation of the push button control switches of such other bank so long as the lock solenoid continues energized. The mechanical latching means of both of said banks of split level push button controls 560 and 561 in such operative latching state being effective to prevent subsequent actuation of any other of said push button controls until the mechanical latching means of both of said banks of push button controls 560 and 561 has been operatively released by energization of a reset solenoid, as hereinafter explained, whereupon the initially actuated push button control switch 560 or 561 will be returned by conventional spring biasing means to the normal open switch contact condition.

In effecting selective energization of the aforenoted right and left bank lock solenoids, it should be noted that the left bank of push button control switches 560 includes a unidirectional current flow control device or diode 586 having a positive terminal connected to the conductor 585 leading from the switch contact 574, while the negative terminal of the diode 586 is connected by a conductor 588 to a terminal of a right bank lock solenoid 631 having an opposite terminal connected by a conductor 632 to a switch contact 633 controlled by a switch element 634 of an Emergency Stop switch 636.

The switch element 634 is normally biased to a switch contact closing position relative to the switch contact 633 connected to the conductor 632 and to an opposite switch contact 635 connected to a conductor 640 leading to the negative conductor 545. Accordingly, upon any one of the left bank of push button control switches 560 being thus first selectively actuated so as to cause the switch element 572 thereof to close the switch contacts 576 and 574, the right bank lock solenoid 631 will be energized to actuate a releasable slidably mounted locking bar 642 of a conventional type indicated by the dash lines and so arranged as to effectively lock the aforementioned mechanical latching means of the right bank of push buttons 561 in an operative latching state relative to the push buttons 561 so as to prevent operation of the push buttons 561 upon the actuation of the locking bar 642 by the energized right bank lock solenoid 631.

Similarly, the right bank of push button control switches 561 includes a conductor 585 leading from the switch contact 574 connected to the positive terminal of a diode 586, while the negative terminal of such diode 586 is connected by a conductor 588 to a terminal of a left bank lock solenoid 643 having an opposite terminal connected by a conductor 644 to the conductor 632 and thereby, as heretofore described, to the negative conductor 545.

Similarly, then upon any one of the right bank push button control switches 561 being first selectively actuated so as to cause the switch element 572 thereof to close the switch contacts 576 and 574, the left bank lock solenoid 643 will be energized to render a conventional type releasable slidably mounted locking bar 646 indicated by the dash lines effective to lock the aforenoted mechanical latching means of the left bank of push buttons 560 in an operative latching state relative to the push button control switches 560 so as to prevent operation of the push buttons 560 upon the actuation of the locking bar 646 by the energized left bank lock solenoid 643.

The microswitches of each of the fork level sensor switch sections 450, 452, 455 and 457 are operably connected to function control relays 550, including the relays 551, 552, 553, 554 and 555 selectively rendered effective by the operator-operated function selector push button controls 590, including selectively operable push button control switches 591, 592, 593 and 594; and the microswitch of the fork level sensor switch sections 450, 452, 455 and 457 selectively rendered effective by the operator-operated split level selector push button controls 560 and 561.

As shown by FIG. 7, the operator-operative function selector push button controls 590, including the storage function push button control 593, the auxiliary lower push button control 591, the auxiliary lift push button control 594 and the retrieve push button control 592, are arranged in a center bank. This center bank of push button controls 590 also includes a mechanical latching means of conventional type operative upon the actuation of the first of any one of the function selector push button controls 590 of FIG. 7 to prevent subsequent actuation of any other of the push button controls 590 until the mechanical latching means has been operatively released, as hereinafter explained, by energization of a reset solenoid, whereupon the initially actuated push button control switch 590 will be returned by conventional spring biasing means to the normal open switch contact condition.

The normally closed microswitches of the fork level sensor switch section 450 are connected by a conductor 597, a resistor 599 and a conductor 600 to a switch contact 602 of the push button control switch 594 and also to a switch contact 604 of the push button control switch 593. The switch contact 602 has an opposite switch contact 607 connected by a conductor 609 to a switch contact 611 of the deceleration function control relay 555. The control switch 594 includes a switch element 613 normally biased to an open contact position. The switch element 613 of the push button control switch 592 may be selectively actuated by the operator to a position to close the switch contacts 602 and 607 to selectively connect the storage and auxiliary lift fork level sensor switch section 450 to the switch contact 611 controlled by a switch arm 615 of the deceleration function relay 555 which is normally biased to an open position relative to the switch contact 611.

The deceleration function relay 555 includes an electromagnetic control winding 601 having one terminal connected through a conductor 603 to the positive power line 530 while an opposite terminal of the control winding 601 is connected through a conductor 605, a resistor 606 and a conductor 608 to the normally open microswitches of the fork level sensor deceleration switch section 457.

One of these microswitches of the deceleration switch section 457, as heretofore explained, may be selectively rendered effective by the operator actuating a corresponding level selector push button control 560 or 561. Thereafter, upon the cam 36A being positioned in the control device 10A of FIG. 5 so as to close the selected microswitch in the deceleration switch section 457, as upon the fork F being correspondingly positioned within a predetermined deceleration range of the selected shelf level and which may begin, for example, at approximately six to twelve inches before such shelf level, closure of the selected deceleration microswitch will cause energization of the control winding 601 of the deceleration function relay 555.

Such energization of the control winding 601 will in turn magnetically actuate the relay switch arm 615 into a position closing the switch contact 611 connected to the storage and auxiliary lift function fork level sensor switch section 450, as heretofore explained. The switch arm 615 is in turn connected through a conductor 616 to a terminal of an electromagnetic control winding 631 of the auxiliary lift function relay 554, which control winding 631 has an opposite terminal connected through a conductor 619 to the positive power line 530. Thus the energization of the control winding 601, dependent upon the fork F being positioned within the critical deceleration range will actuate the relay switch arm 615 to close the relay switch contact 611 so as to in turn effect energization of the control winding 631 of the auxiliary lift function relay 554 dependent upon the selected microswitch of the fork level switch section 450 being in a normal closed contact position to effect the hereinafter described control function.

However, upon the cam 36A being positioned in the control device 10A of FIG. 5 so as to open the closed selected microswitch in the storage and auxiliary lift switch section 450, as upon the fork F being correspondingly positioned to a preset auxiliary lift level somewhat above the selected shelf level, the opening of the selected storage and auxiliary lift microswitch in the sensor switch section 450 will effect de-energization of the control winding 631 in the auxiliary lift function relay 554 to effect the further control functions as will be explained hereinafter.

In addition to the switch element 613, the push button control switch 594 includes a second switch element 617 normally biased to an open switch contact position and effective to be actuated by the operator to close suitable switch contacts 622 and 624 connected to conductors 623 and 625, respectively. The positive power line 530 is connected through a conductor 619 to a switch arm 621 of the relay 554 normally biased to a position closing the contact 620 connected to the conductor 623 and through the closed switch contacts 622 and 624 to conductor 625 and resistor 627 to one terminal of a reset solenoid 630 having an opposite terminal connected through the conductor 632 leading to the negative conductor 545 as heretofore described with reference to the selective energization of the respective right and left bank lock solenoids 631 and 643.

The switch elements 613 and 617 are so arranged that upon the actuation of the push button control switch 594, the switch element 613 leads the switch element 617 so that the switch element 613 closes the switch contacts 602 and 607 before the switch element 617 closes the switch contacts 622 and 624. Accordingly, upon the push button control switch 594 being actuated by the operator, in order to prevent a premature energization of the reset solenoid 630, the switch element 613 first closes switch contacts 602 and 607 and only thereafter does the switch element 617 close switch contacts 622 and 624. Thus upon the auxiliary lift function relay 554 being thereafter de-energized, switch arm 621 closes switch contact 620, as upon the level of the fork F being in a position out of the deceleration range, whereupon the reset solenoid 630 will be effectively energized to actuate a conventional type reset bar 610 indicated by dash lines and arranged to release the mechanical latching means for the push button control switches 560, 561 and 590 so that the initially actuated push button control switch 560 or 561, as well as the initially actuated push button control switch 590, will be returned by conventional spring biasing means to the normal open switch contact condition, as heretofore explained, upon the energization of the reset solenoid 630.

It should be noted, however, that upon the fork F being in a position within the critical deceleration range, the deceleration relay 555 will cause energization of the electromagnetic winding 631 of the auxiliary lift function relay 554 so as to effectively actuate the relay switch arm 621 out of a contacting relation with the switch contact 620 so as to thereupon prevent energization of the reset solenoid 630 until the critical auxiliary lift level of the fork F has been reached upon completion of the auxiliary lift function, whereupon the selected microswitch of the switch section 450 will be actuated by cam 36A to an open contact position, as heretofore explained.

Moreover, the aforenoted energization of the electromagnetic control winding 631 of the auxiliary lift function relay 554 will also actuate a relay switch arm 630 normally biased to an open switch contact relation into a position closing a relay switch contact 632. The relay switch arm 630 is connected by an electrical conductor 628 to the positive operating power line 532, while the switch contact 632 is connected by a conductor 634 to an automatic output lift control line 650 leading to an output terminal 652 of the control network of FIG. 10.

The output terminal 652 is in turn connected by an electrical conductor 654 into the electrical control system, shown by FIG. 14. The conductor 654 leads to a positive terminal of a diode 658 having a negative terminal connected by a conductor 656 to the conductor 512 leading to the operator-operative control switch arm 500 which may be then positioned in a fixed closed relation with the switch contact 499 to effect energization of the automatic lift control relay 478. Such energization of the relay 478 and, in turn, the effective energization of the motor 475 for driving the main and auxiliary lift pumps 477 and 479, will continue so long as the selected auxiliary lift control microswitch of the section 450 and the selected deceleration control microswitch of the section 457 both remain in closed position to jointly effect through the deceleration function relay 555 the energization of the controlling relay winding 631 of the auxiliary lift function relay 554 so as to maintain the controlling relay switch arm 630 in a contact closing relation with the switch contact 632 of the auxiliary lift function relay 554. It will be further noted that the switch contact 604 of the storage relay push button control switch 593 is also connected to the conductor 600 leading from the storage lift switch section 450. The switch contact 604 and an opposite switch contact 633 are controlled by a switch element 635 of the push button control switch 593. The switch element 635 is normally biased in open contact relation with the switch contacts 604 and 633, while the switch element 635 may be actuated into a switch closing relation with the contacts 604 and 633 by the operator appropriately actuating the push button control switch 593. The switch contact 633 is in turn electrically connected through a conductor 637 to an electromagnetic winding 639 of the storage function relay 553. The winding 639 has an opposite terminal connected by a conductor 641 to the positive power line 530.

Thus, upon the switch element 635 closing the contacts 604 and 633, the electromagnetic winding 639 will be effectively energized so long as the microswitch selected by the level selector push button 560 remains in the closed circuit position as shown in the wiring diagram of FIG. 10. Such energization of the winding 639 will actuate a relay switch arm 645 normally biased to an open switch contact relation into a position closing a relay switch contact 647. The relay switch arm 645 is connected by an electrical conductor 649 to the positive operating power line 532, while the switch contact 647 is connected through the automatic output lift line 650 to the output terminal 652 of the control network of FIG. 10.

The output terminal 652 is in turn connected, as shown in FIG. 14, to the conductor 654 which is in turn connected through the diode 658 to the operator-operative lift control switch arm 500 which may be then positioned in a fixed closed relation with the switch contact 499. Thus there may be effected through the switch arm 500 energization of the automatic lift control relay 478 and in turn energization of the motor 475 for driving the main and auxiliary lift pumps 477 and 479, as heretofore explained, so long as the selected storage lift control microswitch of the section 450 remains in a contact closed position.

As may be seen from FIGS. 13 and 14, upon such energization of the motor 475, the electromagnetic control winding 501 having one terminal connected to the input conductor 476 of the motor 475 and an opposite terminal connected to the negative conductor 472 will be thereupon energized so as to cause the normally open drift control valve 503 to be actuated to a closed valve position, whereupon the output of the main and auxiliary lift pumps 477 and 479, as shown diagrammatically in FIG. 13, may be applied through the conduit 505, the three-way control valve 509 and conduit 510 to the lift ram 504 so as to cause a lifting operation of the fork F.

However, upon the selected storage and auxiliary lift control switch of the switch section 450 being biased to an open position as upon the cam 36A being positioned longitudinally on the screw shaft 26A into a position to actuate the cam follower of such microswitch mechanism, the energizing circuit for the automatic lift control relay 478 will be thereupon broken, causing the control relay 478 to effect deenergization of the motor 475 as well as cause the control winding 501 of the drift control valve 503 to be de-energized and the drift control valve 503 thereupon opened so as to cause the lift ram 504 to stop at a selected position.

It will be further noted that upon the storage function push button control switch 593 being actuated into a position to cause the switch element 635 to close the switch contacts 604 and 633, a switch element 691 will be thereupon actuated so as to close switch contacts 692 and 694. The switch contact 692 is connected by an electrical conductor 693 to a switch contact 695 of the storage function relay 553 having a relay switch arm 697 connected to the conductor 641 leading to the positive power line 530. The switch arm 697 is normally biased into a position closing the switch contact 695 so that upon de-energization of the relay winding 639 there may be applied through the closed contacts 692 and 694 of the push button control switch 593 an energizing current to the line 625 to which the contact 694 is connected so as to effect energization of the reset solenoid 630 as in the case of the push button control 594, as heretofore explained. However, similarly upon energization of the relay winding 639 of the function control relay 553, a switch element 697 will be actuated to an open position relative to the switch contact 695 so that energization of the reset solenoid 630 may not be effected.

The switch elements 635 and 691 of the push button control switch 593 are normally biased to an open contact relation and are so arranged that upon the actuation of the push button control switch 593, the switch element 635 leads the switch element 691 so that the switch element 635 closes the switch contacts 604 and 633 before the switch element 691 closes the switch contacts 692 and 694. Accordingly, in the event the fork F has not been positioned to the selected storage level, energization of the relay control winding 639 through the switch element 635 which first closes the switch contacts 604 and 633 will precede the closing of the switch contacts 692 and 694 by the lagging switch element 691 and thereby cause the energized control winding 639 to actuate the switch arm 691 out of contacting relation with the switch contact 695 so as to prevent premature energization of the reset solenoid winding 630.

Further, the switch contacts of the normally closed microswitches of the retrieve fork level switch section 452 are all connected by a conductor 700, resistor element 702 and conductor 704 to a switch contact 706 of the push button control switch 592. The switch contact 706 has an opposite switch contact 707 connected by a conductor 709 to one terminal of an electromagnetic control winding 711 of the retrieve function relay 552. The winding 711 has an opposite terminal connected by a conductor 713 to the positive power line 530. Accordingly, upon a switch element 715, normally biased in an open contact relation with the switch contacts 706 and 707, being actuated by operation of the push button control switch 592 into a switch closing relation with the contacts 706 and 707, the control winding 711 of the retrieve function relay 552 will be effectively energized so long as the microswitch of the retrieve fork level sensor section 452 selected by the level selector push button 560 or 561 remains in a closed circuit position, as shown in the wiring diagram of FIG. 10. Such energization of the retrieve function relay control winding 711 will actuate a relay switch arm 717, normally biased in an open switch contact relation, into a position closing a relay contact 719. The relay switch arm 717 is connected by an electrical conductor 721 to the positive operating power line 532, while the switch contact 719 is connected through an electrical conductor 723 to the automatic output lift line 650 leading to the output terminal 652 of the control network of FIG. 10. The output terminal 652 is in turn connected as shown in FIG. 14, through the conductor 654, diode 658 and conductor 656 to the conductor 512 leading through the operator-operative lift control switch arm 500, which may then be positioned in a fixed closed contact relation with the switch contact 499, so as to effect energization of the automatic lift control relay 478 and in turn energization of motor 475, as well as the control winding 501 to close the drift control valve 503, as heretofore explained.

Further, as heretofore explained with reference to the storage function control relay 553, upon the selected retrieve control microswitch of the switch section 452 being biased to an open position as upon the cam 36A of the control device of FIG. 5 being positioned longitudinally on the screw shaft 26A into a position to actuate the cam follower of such microswitch, the energizing circuit for the automatic lift control relay 478 will be thereupon broken and the motor 475 and control winding 501 de-energized so as to open the drift control valve 503, whereupon the lift ram 504 may be effectively stopped at a selected position.

As heretofore explained with reference to the push button control switches 594 and 593, the push button control switch 592 also includes a second switch element 725 normally biased to an open switch contact position which may be actuated by the operator to close suitable switch contacts 727 and 729 to connect the positive power line 530 through a conductor 731, a relay switch arm 733 of the retrieve function relay 552 normally biased to a contact 737 which is in turn connected through a conductor 739 to the switch contact 727 and 729 closed by the switch element 725 and thereby to the conductor 625 to which the closed contact 729 is in turn connected so as to effect energization of the reset solenoid winding 630 to effect the reset operation.

It may be further noted that the switch elements 715 and 725 are so arranged that upon the actuation of the push button control switch 592, the switch element 715 leads the switch element 625 so that the switch element 715 closes the switch contacts 706 and 707 before the switch element 725 closes the contacts 729 and 727. Thus, upon the push button control switch 592 being actuated by the operator so as to cause switch element 715 to first close switch contacts 706 and 707 and switch element 725 thereafter to close switch contacts 729 and 727, and upon the retrieve function relay control winding 711 being de-energized so that the switch arm 733 is biased into a contact closing relation with switch contact 737, the reset solenoid winding 630 will be effectively energized to effect a release of the locked push buttons 560, 561 and 590. However, inasmuch as the switch element 715 closes the contacts 706 and 707 before the switch element 725 closes the contacts 729 and 727, in the event fork F has not been positioned to the selected retrieve level, energization of the relay control winding 711 will precede the closing of the switch contacts 727 and 729 by the lagging switch element 725 so as to effectively energize the relay control winding 711 so as to actuate the switch arm 733 out of contacting relation with the switch contact 737 and thereby effectively prevent premature energization of the reset solenoid winding 630.

The normally closed microswitches of the auxiliary lower fork level sensor switch section 455 are connected by a conductor 750, resistor 752 and conductor 754 to a switch contact 756 of the push button control switch 591. The switch contact 756 has an opposite switch contact 758 connected by a conductor 760 to a switch contact 762 of the deceleration function relay 555. The control switch 591 includes a switch element 764 normally biased to an open contact position. The switch element 764 may be selectively actuated by the operator to a position to close the switch contacts 756 and 758 so as to selectively connect the auxiliary lower fork level sensor switch section 455 to the switch contact 762 controlled by a switch arm 767 of the deceleration function relay 555. The switch arm 767 is normally biased to an open position relative to the switch contact 762. However, upon energization of the electromagnetic control winding 601 of the deceleration function relay 555, the switch arm 767 will be actuated into a contacting relation with the contact 762.

The relay switch arm 767 is in turn connected through a conductor 769 to a terminal of an electromagnetic control winding 771 of the auxiliary lower function relay 551 and which control winding 771 has an opposite terminal connected through a conductor 773 to the positive power line 530. Thus, the energization of the control winding 601, dependent upon the fork F being positioned within the critical deceleration range, will actuate the relay switch arm 767 to close the relay switch contact 762 so as to in turn effect energization of the control winding 771 of the auxiliary lower function relay 551, dependent upon the selected microswitch of the auxiliary lower switch section 555 being in a normally closed contact position to effect the energization of the auxiliary lower control relay winding 771 through the deceleration function relay 555.

However, upon the cam 36A being positioned in the control device 10A of FIG. 5 so as to open the closed selected microswitch in the auxiliary lower switch section 455, as upon the fork F being correspondingly positioned to a preset level somewhat below the selected shelf level, the opening of the selected auxiliary lower control microswitch in the sensor switch section 455 will effect de-energization of the control winding 771 in the auxiliary lower function relay 551.

In addition to the switch element 764, the push button control switch 591 includes a second switch element 775 normally biased to an open switch contact position and which may be actuated by the operator to close suitable contacts 777 and 779 connected to conductors 625 and 781, respectively. The positive power line 530 is connected through a conductor 783 to a switch arm 785 of the relay 551 normally biased to a position closing a contact 787 connected to the conductor 781 and through the switch contacts 777 and 779 closed by switch element 775 to conductor 625 and through resistor 627 to one terminal of the reset solenoid winding 630 to effect the energization thereof as heretofore explained. Switch elements 764 and 775 are so arranged that upon the actuation of the push button control switch 591, the switch element 764 leads the switch element 775 so that switch element 764 closes switch contacts 756 and 758 before the switch element 775 closes the contacts 777 and 779 so as to prevent premature energization of the reset solenoid 630, prior to energization of the relay control winding 771, as heretofore explained.

The auxiliary lower function control relay 551 further includes a relay switch arm 790 connected by a conductor 791 to the power line 532. The relay switch arm 790 is normally biased to an open contact relation with a switch contact 793 and upon energization of the relay control winding 771, as heretofore explained, the switch arm 790 is actuated to a position closing the switch contact 793. The switch contact 793 is in turn connected by a conductor 795 to an automatic lower output terminal 797 which, as shown in FIG. 14, is in turn connected by a conductor 799 to one terminal of an electromagnetic control winding 800 having an opposite terminal connected by a conductor 801 to the negative line 472. The winding 800 provides a control solenoid for a normally closed auxiliary lowering solenoid valve 805, as shown in FIG. 13.

The valve 805 is so arranged that, upon energization of the control winding 800, the valve 805 is actuated by the energized control winding 800 to an open relation, while upon de-energization of the control winding 800, the valve 805 is biased to a closed relation as upon the cam 36A being positioned in the control device 10A of FIG. 5 so as to open the closed selected microswitch in the auxiliary lower switch section 455, upon the fork F being lowered from the storage level to a preset auxiliary lower level, indicated graphically in FIG. 9, and which level approaches the retrieve level and is somewhat below the selected shelf level so as to effect a discharging of a pallet or load onto the selected shelf, as heretofore explained.

During such step of discharging or lowering of the fork F, the energization of the control winding 800 will actuate the normally closed valve 805 to an open position so as to permit the discharge of hydraulic pressure medium from the lift ram 504 through a conduit 807, flow control valve 810, conduit 811 and through the now open valve 805 to a return conduit 813 and the conduit 506 to the reservoir 502. The return rate of flow of the hydraulic pressure medium from the lift ram 504 effected by the flow control valve 810 is so set as to cause the fork F to be lowered at a decelerated or at such a slow rate of speed that the load or pallet may be placed gently on the selected shelf by the lowering of the fork F relative thereto.

The deceleration range or range over which the fork F may be positioned by the lift ram 504 at such a decreased or slow rate of speed is determined by the closure of the selected microswitch of the deceleration swithc section 457 by the cam 36A. The cam 36A is so arranged that such closure of the selected deceleration microswitch occurs at a level below the retrieve level shown graphically by FIG. 9, as well as below the auxiliary lower level and which levels precede the selected shelf level and the cam 36A further continues to retain the selected deceleration microswitch in such closed condition to a level just above the storage level which in turn is preset at a level slightly above the selected shelf level.

It will be seen that the effective deceleration range over which the control winding 601 of the deceleration relay 555 is energized extends from a level below the retrieve and auxiliary lower levels to a level above the storage level, shown graphically by FIG. 9. Furthermore, over this deceleration range the energized control winding 601 actuates the relay switch arms 615 and 767 into a position closing the respective switch contacts 611 and 762 so as to permit energization of the control windings 631 and 771 of the auxiliary preset function relays 553 and 551, respectively, so long as the level selected microswitch of the function selected auxiliary lift switch section 450 or the function selected auxiliary lower switch section 455 is retained in a closed position.

However, upon such selected microswitch being opened by the cam 36A of the control device 10A at the respective storage or auxiliary lower level the respective control windings 631 or 771 will be de-energized respectively to terminate the step of raising the fork F from the retrieve level to the storage level in retrieving a load or pallet from the selected shelf in effecting the auxiliary lift function of the relay 554 or alternatively terminate the step of lowering the fork F from the storage level to the auxiliary lower level in placing or storing a load or pallet on the selected shelf in effecting the auxiliary lower function of the relay 551, as shown graphically by FIG. 9.

It should be further noted that the energization of the control winding 601 of the deceleration function relay 555, initiated in the aforenoted deceleration range by the cam 36A closing the selected microswitch of the deceleration switch section 457 at a level preceding the retrieve level, in addition to actuating the relay switch arms 615 and 767 to contact closing position, the energization of such control winding 601 will also actuate a third relay switch arm 825 into a contact closing relation with a switch contact 827. The switch arm 825 is normally biased to an open relation to the contact 827, as shown by FIG. 10.

The switch arm 825 is connected by a conductor 829 to the positive operating power line 532, while the switch contact 827 is connected by a conductor 831 to an automatic deceleration output terminal 850, which, as shown in FIG. 14, is in turn connected by a conductor 852 to one terminal of an electromagnetic control winding 854 having an opposite terminal connected by a conductor to the negative line 472. The winding 854 provides a control solenoid for a normally closed lift deceleration control valve 860, as shown by FIG. 13.

The valve 860 is so arranged that upon energization of the control winding 854, the valve 860 is actuated by the energized control winding 854 to an open relation, while upon de-energization of the control winding 854, the alve 860 is biased to a closed relation.

Thus, upon the cam 36A being positioned in the control device 10A of FIG. 5 within the forenoted deceleration range extending from a corresponding position of the fork F below the retrieve level to above the storage level, as heretofore explained, the selected microswitch of the deceleration switch section 457 will be closed by the cam 36A to in turn effect through the deceleration function relay 155 the energization of the control winding 854 to open the valve 860 so as to permit the discharge of 555 pressure medium supplied by the auxiliary pump 479 to the conduit 507 to be effectively diverted from the check valve 508 and main pressure conduit 505.

The hydraulic pressure medium supplied by the auxiliary pump 479 may then be applied through the open deceleration control valve 860, conduit 862 and a flow control valve 865 to the return conduits 813 and 506 leading to the hydraulic reservoir 502. The return rate of flow of the hydraulic pressure medium bled from the output conduit 507 of the auxiliary pump 479 by the open valve 860, as effected by the flow control valve 865, is so set as to cause the ram 504 to lift the fork F at a decelerated or slow rate of speed.

Thus the fork F will approach the retrieve level or the storage level at such a slow rate of speed that the subsequent opening of the selected microswitch in the retrieve switch section 452 or selected microswitch in the storage switch section 450 may effect a cessation of the lift operation of the fork F by the ram 504 with no appreciable shock.

It may be further noted that while the negative conductor 545 leads to one terminal of the plurality of pairs of indicator lamps 543, the opposite terminal of each of the pairs of indicator lamps 543 is connected, respectively, to a relay switch contact 544 which is effectively controlled in each of the relays 551, 552, 553 and 554 by a relay switch arm 546 normally biased in an open contact relation to the contact 544. The switch arm 546 is connected to the positive power line 530 through conductors 619, 641, 731 and 783 of the respective relays 551, 552, 553 and 554 and upon an electromagnetic control winding 631, 639, 711 and 771 of one of the respective relays 554, 553, 552 and 551 being energized as heretofore explained, the relay switch arm 546 of the relay corresponding to that of the energized control winding will be actuated to a position closing the contact 546 to effect energization of a corresponding pair of indicator lamps 543 connected to the closed contact 544 so as to indicate to the operator the function relay 551, 552, 553 and 554 which is then in effective operation.

Figure 12:
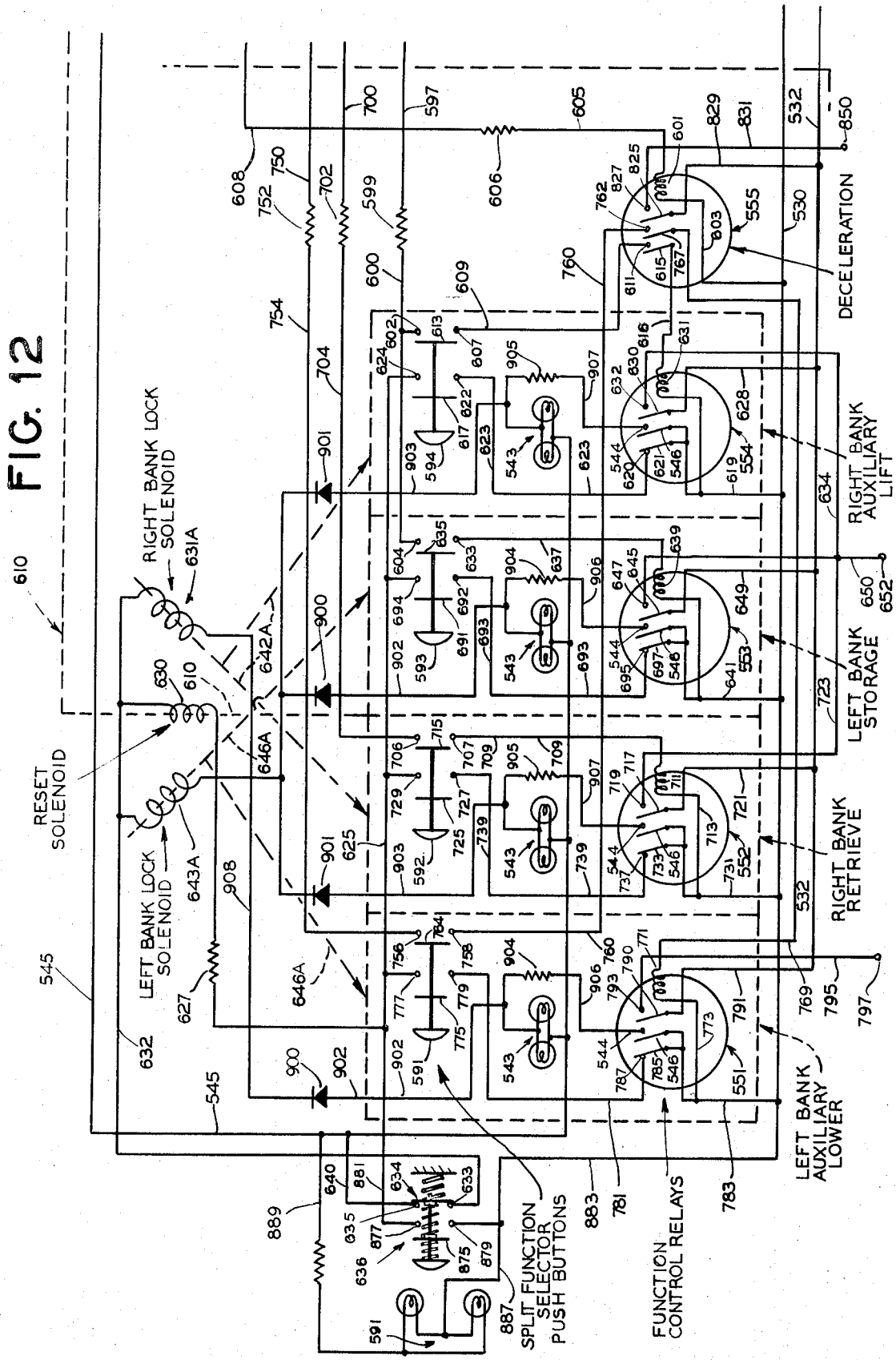
FIG. 12 is a schematic wiring diagram of a split function electrical control system embodied in a preferred form of automatic shelf selector system which may include a carrier assembly apparatus of the type illustrated by FIG. 5 and a control console of the split function selector type illustrated by FIG. 8; with relay elements of FIG. 10 indicated.

Furthermore, the emergency push button stop switch 636, in addition to controlling the switch element 634 normally biased to a position closing switch contacts 633 and 635, as heretofore explained with reference to FIG. 10, includes a second switch element 875 normally biased to a contact open relation to switch contacts 877 and 879 connected, respectively, by conductor 881 to conductor 625 and by conductor 883 to the positive power line 530, as indicated at FIG. 12.

The push button switch 636 may be actuated so as to cause the switch element 875 to first close the switch contacts 877 and 879 and thereafter cause the switch element 635 to open the switch contacts 633 and 635. The closing of the switch contacts 877 and 879 by the actuation of the switch element 875 will connect the conductor 625 leading to the reset solenoid control winding 630 to the positive power line 530 so as to effectively energize the reset solenoid control winding 630.

Such emergency energization of the reset solenoid winding 630 by the operator-operative switch 636 will in turn serve to release the mechanical latching mechanism of the respective push button control switches 560, 561 and 590, as heretofore explained, and thereby clear all of the push button control switches that may have been actuated in the cycle of operation or correct for prior actuation of a function switch.

Thereafter the subsequent actuation of the emergency stop switch 636 so as to cause the switch element 634 to open the switch contacts 633 and 635 will open the connection of the conductor 632 leading to the negative conductor 545 so as to effectively de-energize the right or left bank lock solenoid control windings 631 and 643 as may have been energized, as heretofore explained, to prevent strain in the event the opposing force of the lock solenoid may have prevented the energized reset solenoid 630 from properly functioning to release the locking action thereof on the mechanical latching mechanism of the corresponding level selector push button control switches 560 and 561.

The push button emergency stop switch 636 may be of a conventional type so arranged that the switch element 634 thereof may be successively positioned in an opening and closing relation to the switch contacts 633 and 635 while the switch element 875 continues in the initially actuated closed relation to the switch contacts 877 and 879 so that the reset solenoid winding 630 may be effectively energized to provide the desired corrective action in releasing the mechanical latching mechanism of one or the other of the level selector push button control switches 560 or 561.

Furthermore, it may be noted that connected across the positive power line 530 and the negative conductor 545 by the respective conductors 887 and 879 are a pair of electric lamps 891 effectively energized to indicate to the operator that the electric power is operative and effectively connected to the control network of FIG. 10.

Moreover, the safety switch or microswitch 542, having the switch arm 540 normally biased to a position to close the contact 537, is positioned on one of the bars 24A of the control device 10A of FIG. 5 at the extreme permissible limit in the positioning of the cam 36A in the direction indicated by the arrow 46A and corresponding to the upper permissible limit in the positioning of the fork F by the lift ram 504.

Accordingly, in the event of a failure of a selected microswitch in the retrieve, storage or auxiliary lift level switch sections 452 and 450 to be effectively opened by the cam 36A as the cam 36A may be longitudinally positioned on the screw shaft 26A, the safety switch or microswitch 542 may be actuated by the cam 36A to effectively disconnect the automatic control network of FIG. 10 from the source of electrical energy or battery 480 and in turn cause the function relay 552, 553 or 554 in turn to de-energize the automatic lift controy relay 478 and motor 475 controlled thereby. Such failure condition will in turn be indicated to the operator by the immediate de-energization of the indicator lamps 558 and 891 upon the opening of the safety switch 542 by the cam 36A upon reaching the extreme limit of permissible travel in the control device 10A of FIG. 5.

Split Function Selector Control Network and Console

In a further modified form of the invention shown by FIGS. 8 and 12, there is provided a split function selector instead of the split level selector of FIGS. 7 and 10. The control network of the modified form of the invention, as hereinafter described with reference to FIG. 12, may be generically similar to the split level selector control network of FIG. 10, subject to the specific modification of the push button function selector switches in the split function form of FIGS. 8 and 12.

Such modification may include left bank auxiliary lower and storage function selector push button control switches 591 and 593 and right bank retrieve and auxiliary lift function selector push button control switches 592 and 594, as shown by the console panel of FIg. 8 and portion of the control network of FIG. 12, while the remainder of the control network may be similar to that heretofore described with reference to FIG. 10 with the left and right bank level selector lock solenoids 631 and 643 and the control circuitry therefor of FIG. 10 eliminated.

However, in a further modification of the invention, there may, of course, be provided a split level and split function selector control network comprising the remainder of the control network of FIG. 10, including the left and right bank locking solenoids 631 and 643, as heretofore described, together with the modified form of the split function selector control network of FIG. 12.

In the modified form of the split function selector of FIG. 8 and control network of FIG. 12, the left bank of push button control switches 591 and 593 and the right bank of push button control switches 592 and 594 include in each bank a mechanical latching mechanism of conventional type effective upon the actuation of the first of the push button control switches of one bank of switches to prevent actuation of the other of the push button control switches of that one bank.

Further, energization of a lock solenoid of the other bank effected by the actuation of the first of the push button controls of the one bank of push button controls, as heretofore explained, will thereupon render operatively effective the mechanical latching mechanism of the push button control switches of the other bank. This will in turn prevent a subsequent actuation of the push button control switches of such other bank so long as the lock solenoid continues energized.

The mechanical latching mechanism of both of said banks of split function push button control switches in such operative latching state are effective to prevent subsequent actuation of any other of said push button control switches until the mechanical latching mechanism of both of said banks of push buttons have been operatively released, as upon energization of a reset solenoid 630A or FIG. 12, as hereinafter explained with reference to the left bank and right bank lock solenoids 643A and 631A of FIG. 12.

In effecting selective energization of the aforenoted left and right bank lock solenoids, it may be noted that the left bank of function selector push button control switches 591 and 593 include unidirectional current flow control devices or diodes 900 having a positive terminal connected by a conductor 902, resistor 904 and conductor 906 to a normally open switch contact 544 controlled by the switch arm 546 of respective auxiliary lower and storage function relays 551 and 553; while negative terminals of the diodes 900 are connected by a conductor 908 to a terminal of a control winding 631A of a right bank lock solenoid having an opposite terminal connected by a conductor 632 through the switch element 634 of the Emergency Stop Switch 636 to the negative conductor 545, as heretofore explained with reference to the control network of FIG. 10.

It will be seen then that upon one of the left bank of function selector push button control switches, for example 591, being first selectively actuated so as to cause the switch element 764 of the left bank control switch 591 to close switch contacts 756 and 758, there may be effected energization of control winding 771 of the auxiliary lower function relay 551, or should the other left bank push button control switch 593 be first actuated to cause the switch element 635 to first close switch contacts 604 and 633, there may be effected energization of the control winding 639 of the storage function relay 553. Thereupon the relay switch arm 546 of the first of the selectively energized left bank relays will be actuated by the energized relay control winding into contacting relation with the switch contact 544. The closing of the switch contact 544 by the relay switch arm 546 will in turn apply from the positive power line 530 energizing current through the then closed switch contact 544 and through the diode 900 to the control winding 631A of the right bank lock solenoid.

The control winding 631A of the right bank lock solenoid, upon being so energized, will actuate a releasable slidably mounted locking bar, of a conventional type, illustrated schematically by dash lines 642A and so arranged as to effectively lock the aforenoted mechanical latching mechanism of the right bank of push button control switches 592 and 594 in an operative latching state relative to the push button switches 592 and 594.

The actuated locking bar 642A will then be effective to prevent operation of the right bank of push buttons 592 and 594 upon such energization of the control winding 631A of the right bank lock solenoid effected by the first selective actuation of one of the left bank of push button control switches 591 or 593.

Similarly, the right bank of function selection push button control switches 592 and 594 includes unidirectional current flow control devices or diodes 901 having a positive terminal connected by a conductor 903, resistor 905 and conductor 907 to a normally open switch contact 544 controlled by a switch arm 546 of the respective retrieve and auxiliary lift function relays 552 and 554; while negative terminals of the diodes 901 are connected by a conductor 909 to a terminal of a control winding 643A of a left bank lock solenoid having an opposite terminal connected by a conductor 632 through the switch element 634 of the Emergency Stop Switch 636 to the negative conductor 545.

It will be seen that upon one of the right bank of function selector push button control switches, for example 592, being first selectively actuated so as to cause the switch element 715 of the right bank control switch 592 to close switch contacts 706 and 707, there may be effected energization of control winding 711 of the retrieve function relay 552, or should the other right bank push button control switch 594 be first actuated to cause the switch element 613 to first close switch contacts 602 and 607, there may be effected energization of the control winding 631 of the auxiliary lift function relay 554. Thereupon the relay switch arm 546 of the first of the selectively energized right band relays will be actuated by the energized relay control winding into contacting relation with the switch contact 544. The closing of the switch contact 544 by the relay switch arm 546 will in turn apply from the positive power line 530 energizing current through the then closed switch contact 544 and through the diode 901 to the control winding 643A of the left bank lock solenoid.

The control winding 643A, upon being so energized, will then cause a conventional type releasable slidably mounted locking bar, illustrated schematically by the dash lines 646A, to effectively lock the aforenoted mechanical latching mechanism of the left bank of push button control switches 591 and 593 in an operative latching state relative to the push button control switches 591 and 593.

The actuated locking bar 646A will then be effective to prevent operation of the left bank of push buttons 591 and 593 upon such energization of the control winding 643A of the left bank lock solenoid effected by the first selective actuation of one of the right bank of push button control switches 592 or 594.

As shown by FIG. 8, the level selector operator-operative push button control 560 is arranged in a center bank. This center bank of push button controls 560 may also include a mechanical latching mechanism of conventional type operative upon the actuation of the first of any one of the level selector push button controls of FIG. 8 to prevent subsequent actuation of any other of the push button controls 560 until the mechanical latching mechanism has been effectively released by operation of the reset solenoid 630.

As heretofore explained with reference to the control network of FIG. 10, upon the cycle of operation of the selected function control relay 551, 552, 553 or 554 being completed and the respective controlling relay winding 771, 711, 639, or 631 being de-energized, the relay switch arm 546 operated thereby will open the switch contact 544 to thereby effectively de-energize the control winding 631A or 643A of the effective lock solenoid; while the relay switch arm 785, 733, 697 or 621 of the selected function relay will thereupon close an effective control circuit for applying from the positive power line 530 an energizing current through the conductor 625 to the reset control winding 630 which will in turn be returned through the conductor 632 and switch element 634 to the negative conductor 545. Thereupon the control winding 630 of the reset solenoid will be effectively energized upon completion of the selected cycle of operation so as to actuate a conventional reset bar, illustrated schematically by the dash lines 610, to release the mechanical latching mechanism for the left bank function selector push buttons 591 and 593, the right bank function selector push buttons 592 and 594, as well as release the mechanical latching mechanism for the level selector push buttons 560 of FIG. 8 in an arrangement in which the actuated push buttons may be returned by conventional spring biasing means to the normal unactuated position of the other of such push buttons.

Moreover, in a further modified form of the invention, a split level push button selector such as shown by FIGS. 7 and 10 may be combined with a modified split function push button selector such as shown by FIGS. 8 and 12. In such further modified form of the invention, the energization of the control winding 630 of the reset solenoid, as upon completion of the selected cycle of operation, may similarly actuate the conventional reset bar 610 to release the mechanical latching mechansism for both the split level left and right banks of push button selector switches 560 and 561 of FIGS. 7 and 10 as well as actuate the reset bar 610 so as to release the mechanical latching mechanism for both the split function left and right banks of push button selector switches, including the left bank of push button selector switches 591 and 593 and the right bank of push button selector switches 592 and 594, of FIGS. 8 and 12. Each of the actuated push button selector switches upon such release of the mechanical latching mechanism on completion of a selected cycle of operation are returned by conventional spring biasing means to a normal unactuated position for the respective push buttons and which provides no indication of the immediately preceding selected shelf level at which the just completed cycle of operation had been applied.

Figure 11:
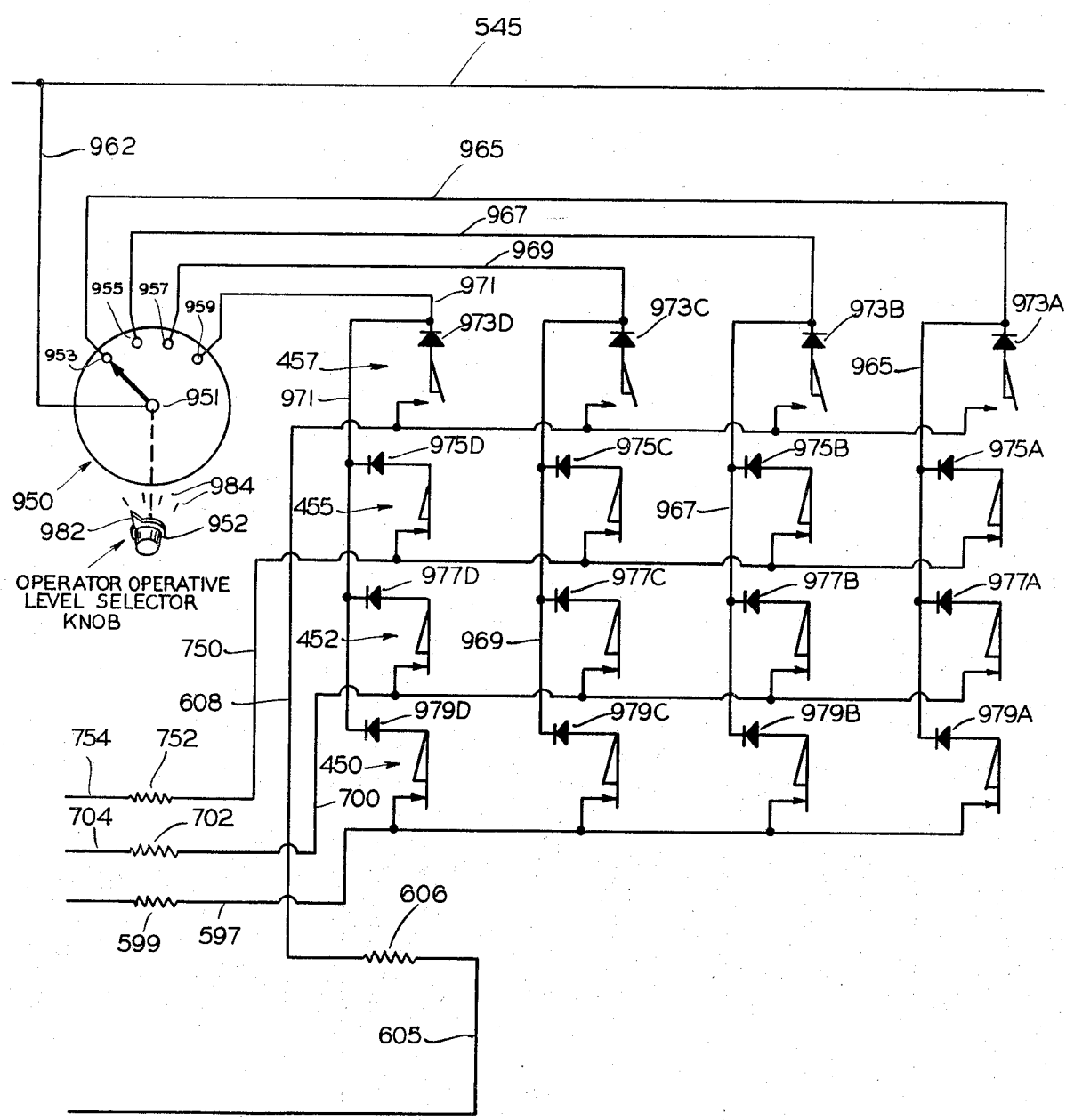
FIG. 11 is a modified form of the level selector system of FIG. 10 utilizing a rotary level selector switch means instead of the push-button split level selector switch means of FIG. 10.

Operator-Operative Rotary Level Selector Switch with Selected Shelf Level Indicator Memory Means In a further modified form of the invention shown by FIG. 11, there is provided instead of the push button level selector 560 and 561 of FIGS. 7 and 10, and 560 of FIG. 8, a rotary switch 950, including a switch arm 951 angularly positioned by an operator-operative knob 952 to selectively close one of a plurality of switch contacts, illustrated herein by way of example as including switch contacts 953, 955, 957 and 959.

The arm 951 is connected by an electrical conductor 962 to conductor 545 leading to the negative terminal of a source of electrical energy or battery 480, as shown by FIGS. 10 and 14. The switch contacts 953, 955, 957 and 959 are connected, respectively, to conductors 965, 967, 969 and 971 leading from the negative terminals of respective diodes 973A, 973B, 973C and 973D of a first set of diodes. Each of these diodes of the first set of diodes have a positive terminal connected to an output terminal of a different one of a plurality of microswitches of the deceleration switch section 457. The microswitches of the switch section 457, as shown by FIG. 11, are of a type normally biased to an open switch contact position.

Such microswitches of the deceleration switch section 457 are positioned on the tie bars 24A of the control device 10A, as shown by FIG. 5 with reference to the microswitches 50A, in predetermined locations so that each of the microswitches of the switch section 457 may be selectively closed by the cam 36A over a deceleration range beginning at a preset point corresponding to a position of the fork F of, for example, from six to twelve inches below the selected shelf level to a point a predetermined distance immediately above the selected shelf level, as heretofore explained with reference to the control network of FIG. 10, and in which arrangements the deceleration range of any one selected shelf level does not extend into the deceleration range of any of the other selected shelf levels.

Furthermore, the conductors 965, 967, 969 and 971 also lead from the negative terminal of a plurality of separate diodes in each of three sets of other diodes, including diodes 975A, 975B, 975C and 975D of a second set; diodes 977A, 977B, 977C and 977D of a third set; and diodes 979A, 979B, 979C and 979D of a fourth set of other diodes.

The diodes of the second set of diodes each have a positive terminal connected respectively to an output terminal of a different one of a plurality of microswitches of the auxiliary lower switch section 455; the diodes of the third set of diodes each have a positive terminal connected respectively to an output terminal of a different one of a plurality of microswitches of the retrieve switch section 452; and the diodes of the fourth set of diodes each have a positive terminal connected respectively to an output terminal of a different one of a plurality of microswitches of the storage and auxiliary lift switch section 450. The microswitches of the switch sections 455, 452 and 450, as shown by FIG. 11, are of a type normally biased to a closed switch contact position.

Such microswitches of the switch sections 455, 452 and 450 are positioned on the tie bars 24A of the control device 10A, as shown by FIG. 5 with reference to the microswitches 50A, in predetermined locations so that (1) each of the microswitches of the switch section 455 may be selectively opened by the cam 36A upon a lowering of the fork F from a selected storage level to a position corresponding to a predetermined position of the fork F below a selected shelf level and at which position the opening of the selected microswitch of the switch section 455 may terminate a selected auxiliary lowering function of the fork F in the storage of a pallet or load carried by the fork F onto the selected shelf; (2) each of the microswitches of the switch section 452 may be selectively opened by the cam 36A at a position corresponding to a predetermined position of the fork F below a selected shelf level and at which position the opening of the selected microswitch of the switch section 452 may terminate a selected raising of the fork F to such level in a selected retrieve function of the fork F relative to a selected shelf; and (3) each of the microswitches of the switch section 450 may be selectively opened by the cam 36A at a position corresponding to a predetermined position of the fork F above a selected shelf level and at position either (a) the opening of the selected microswitch of the switch section 450 may terminate a selected raising of the fork F in a selected storage level function of the fork F from which level the selected auxiliary lowering function of the fork F of (1) may be subsequently initiated or (b) the opening of the selected microswitch of the switch section 450 may terminate a selected raising of the fork F from the selected retrieve level of (2) and at which subsequently raised position of the fork F the opening of the selected microswitch of the switch section 450 may terminate an auxiliary lift function of the fork F in the retrieval of a pallet or load from the selected shelf, as heretofore explained with reference to the control network of FIG. 10.

It may be further noted that input terminals of the microswitches of each of the respective switch sections 457, 455, 452 and 450 are connected by respective conductors 608, 750, 700 and 597 to the function control relay 550 of the control network of FIG. 10 or FIG. 12, and through which, as heretofore explained with reference thereto, the input to the microswitches of the deceleration switch section 457 is connected to the positive power line 530, while the inputs to the microswitches of the auxiliary lower switch section 455, retrieve switch section 452 and storage and auxiliary lift switch section 450 may be selectively connected by the respective operator-operative relays 551, 552, 553 and 554 of the function control relay 550 to power line 530 leading from the positive terminal of the battery 480, as shown by FIGS. 10, 12 and 14. Corresponding numerals in the drawings of FIG. 11 indicate corresponding parts to those heretofore described and explained with reference to the control network of FIGS. 10 and 12.

Thus, while the aforenoted operator-operative relays 551, 552, 553 aNd 554 of the function control relays 550 may selectively render the function of the respective switch sections 455, 452 and 450 effective, the shelf level or the effective microswitch in the deceleration switch section 457 and in the switch section 455, 452 or 450 selected by the operator-operative function control relay 550 will be in turn selected by the angularly positioned switch arm 951 and the switch contact 953, 955, 957 and 958 selectively closed thereby. The respective conductors 965, 967, 869 and 971 render effective the respective microswitches connected thereto for providing the selected function, as heretofore explained, relative to a corresponding selected shelf level to that selected by the swtich 951 as angularly positioned by the operator-operative control knob 952.

The rotary level selector switch 950 provides a convenient memory means effective upon completion of a selected cycle of operation in that the switch arm 951 and angular position of the operator-operative control knob 952 remains in its angular adjusted position, as may be indicated by a pointer 982 carried by the knob 952 and arranged in cooperative relation to suitable indicia 984 to indicate the last selected shelf level at which the immediately past cycle of operation may have been effectuated.

In the aforenoted push button level selector of FIGS. 7 and 10, the operator-operative push buttons 560 and 561 and the push buttons 560 of FIG. 8 are returned to their normal unactuated position upon completion of the immediate cycle of operation. Thus in the push button level selector there is no reminder provided the operator as to the level at which such cycle of operation may have been effectuated so that the operator must rely on his memory or on accurately actuating the proper level selector in order to conduct a succeeding cycle of operation at such level. In the form of the invention of FIG. 11, a constant reminder is provided the operator in that the operator-operative knob 952 and pointer 982 in cooperative relation with the indicia 984 remains in its angularly adjusted position until the operator may decide to proceed to another selected shelf level.

OPERATION

In the operation of the modified form of the invention of FIGS. 5 through 12, in order to either store a load or pallet on a selected shelf rack or retrieve a load or pallet from a selected shelf rack, it may be noted that the operator-operative switch 517 will be normally biased to the "ON" position for automatic operation, as shown by FIG. 10. Thereupon one of a plurality of level selector switches including the push buttons 560 or 561 of FIGS. 7 and 10, or one of the push buttons 560 of FIGS. 8 and 12, may be selectively actuated, or the rotary switch arm of FIG. 11 may be angularly positioned by the operator-operative knob 952 so as to close a selected switch contact to render effective in relation to a selected shelf rack one of the microswitches in each of the switch sections 450, 452, 455 and 457 for effecting a predetermined control function in relation to the shelf rack selected by such operation of the level selector push button or operator-operative knob.

Thereafter one of the operator-operative push buttons 591, 592, 593 and 594 of FIGS. 7 and 10 or FIGS. 8 and 12 may be operated to selectively render one of the switch sections 450, 452 or 455 effective and thereby the selected microswitch of each such switch section operative to provide the control function predetermined for such selective operation effective in relation to the rack shelf level selected by the operation of the first mentioned level selector switches.

Before the operation of the shelf selector system of FIGS. 5 through 12, the microswitches 50A, shown by FIG. 5, are adjusted in a longitudinal direction of the carrier sassembly 14A on the tie rods 24. The location of each set of the microswitches 50A which comprise microswitch sets 450, 452, 455 and 457, shown by FIGS. 5, 10, 11 and 12, are located circumferentially of the cam 36A with each set extending longitudinally of the pair of tie rods 24A.

Calibration is then made between the longitudinal location of the microswitches 50A on the tie rods 24A and the preselected rack shelf level pattern, which coincides with the fork height pattern and the control functions to be effected in relation to the preselected rack shelf level pattern. It should be noted, here again, that the rack shelf level pattern must be consistent at one setting of the operator-operative level selector switches, but the shelf levels need not be evenly spaced.

Storage Function

Now in order to effect a storage function, the operator-operative push button 593 of FIGS. 10 and 12 may be actuated to a switch closed position whereupon the control winding 639 of the storage function control relay 553 will be energized through the normally closed heretofore selected microswitch of the switch section 450 causing in turn relay switch arm 645 to direct energizing current through the output conductor 650 of the control network of FIGS. 10 and 12.

The energizing current applied through the output conductor 650 will be in turn applied through a closed switch 500 to the control winding 495 of th relay 478 of the electrical control system of FIG. 14 to effect energization of the motor 475 and closure of the normally open drift control valve 503 of FIG. 13.

The motor 475 will be thereupon continuously energized to drive the main and auxiliary pumps 477 and 479 of the hydraulic control system of FIG. 13 to cause the lift ram 504 to position the fork F upwardly at maximum speed drawing out tape T of FIGS. 5 and 15 in turn rotating the drum 28A and the lead screw 26A of the control device 10A of FIG. 5.

The rotation of the lead screw 26A will in turn move the cam 36A longitudinally of the carrier assembly 14A in the direction shown by arrow 46A synchronous with the position of the fork F. However, upon the fork F being raised to a predetermined position below the selected shelf level of, for example, approximately six to twelve inches before the selected shelf level, deceleration in the lift speed of the ram 504 begins.

In effecting such deceleration, the lead screw is correspondingly rotated by the ram 504 in rapidly raising the fork F to the deceleration point so as to cause the cam 36A to be moved longitudinally along the lead screw 26A and at the deceleration point to close the normally open selected microswitch in the deceleration switch section 457 which had heretofore been rendered operative by the operator-operative level selector switches 560, 561 or knob 952 of FIGS. 10, 11 and 12, as heretofore explained.

The closing of the selected microswitch in the deceleration switch section 457 will thereupon cause energization of the control winding 601 of the deceleration function control relay 555 to cause the relay switch arm 825 to direct an energizing current through the deceleration output line 831 of the control network of FIGS. 10 and 12. The output current applied through the line 831 will in turn effect energization of a control winding 854 of the electrical control system of FIG. 14 to in turn open a normally closed deceleration control valve 860 of the hydraulic control system of FIG. 13 so as to divert from the lift ram 504 and through the deceleration flow control valve 865 hydraulic pressure medium from the output of the auxiliary pump 479.

The speed at which the ram 504 lifts the fork F after passing the deceleration point will be then effectively decreased and controlled by the deceleration flow control valve 865 until the cam 36A, while retaining the selected microswitch of the switch section 457 closed, is moved further longitudinally along the lead screw 26A at a decreased speed to open the selected microswitch of the storage switch section 450 at a position of the fork F slightly above the level of the selected shelf.

The opening of the selected microswitch of the storage switch section 450 will terminate the energization of the control winding 639 of the storage function relay 553 and in turn effect through the control relay 478 de-energization of the motor 475, cessation of operation of the main and auxiliary pumps 477 and 479 and deenergization of the control winding 501 of the drift valve 503 which may then be returned to its normal open condition. Also, the level selector and function selector push button switches of FIGS. 7, 8, 10 and 12 are of a type biased by suitable spring means to a normal unactuated position upon the reset solenoid 630 being thereupon energized to release the mechanical latching mechanism for such push button switches, as heretofore explained.

Upon completion of the foregoing storage function, as indicated by the de-energization of the lamps 543 and 587, the operator may then operate the control arm 511 so as to selectively position the three-way control valve 509 from the lift position, as shown by FIG. 13, to an intermediate position closing the conduit 510 so that the hydraulic pressure medium applied to the lift ram 504 may not then be drained off through the control valve 509.

AUXILIARY LOWER FUNCTION

Thereafter, in order to lower the pallet or load carried by the fork F gently onto the selected shelf, the operator once again closes the same level selector switch as before so as to render effective both the corresponding microswitch in the deceleration switch section 457 closed by the cam 36A as well as the normally closed selected microswitch in the auxiliary lower switch section 455.

Thereafter, the operator may selectively actuate the auxiliary lower function push button control switch 591 to effect energization of the control winding 771 of the auxiliary lower function relay 551.

However, it should be noted that such energization of the relay control winding 771 is dependent upon the control winding 601 of the deceleration function control relay being energized so as to cause the relay switch 767 to be closed to in turn direct the energizing current for the auxiliary lower control winding 771 through the closed switch element 764 of the push button control switch 591 and the normally closed level selector microswitch in the auxiliary lower switch section 455. Should the operator inadvertently close a level selector switch other than that actuated for the immediately preceding storage function, the subsequent erroneously selected microswitch in the deceleration switch section 457 would not be biased to a closed position by the cam 36A and the deceleration function relay 555 would remain in a de-energized condition to prevent in turn a subsequent erroneous energization of the auxiliary lower function relay 551 upon closure of the push button control switch 591 by the operator.

Upon the proper energization of the deceleration function control relay 555 and the auxiliary lower function control relay 551, the switch arm 790 of the relay 551 will direct an energizing current through the output line 795 of the control network of FIGS. 10 and 12 to in turn effect energization of the control winding 800 of the electrical control system of FIG. 14.

The energization of the control winding 800 will in turn actuate the normally closed auxiliary lower control valve 805 of the hydraulic control system of FIG. 13 to an open position so that the hydraulic pressure medium applied to the lift ram 504 may be bled off through the lowering flow control valve 810 and now open control valve 805 to the reservoir 502. This in turn permits the lift ram 504 and the fork F positioned thereby to be slowly lowered from the storage level above the selected shelf and to place the pallet or load carried by the fork F gently upon the selected shelf as the fork F is effectively lowered to a position below the selected shelf level and to an auxiliary lower level which may coincide with or approximate the retrieve level indicated graphically by FIG. 9. This lowering of the fork F is effected in a deceleration range within which the selected microswitch of the deceleration switch section 457 is continuously held in a closed position during the corresponding positioning of the cam 36A.

Upon the fork F being lowered to such auxiliary lower level below the selected shelf level, the cam 36A will actuate the selected microswitch in the auxiliary lower switch section 455 to an open position, thereupon effectively deenergizing the auxiliary lower function relay 551 so as to in turn de-energize the control winding 800 of the control valve 805 which will then be biased to a closed valve relation so as to stop the further drainage of the hydraulic pressure medium from the lift ram 504 and terminate the lowering of the fork F to conclude the auxiliary lowering function.

The three-way valve 509 may then be positioned by the operator-operative arm 511 to a position connecting the conduit 510 through the valve 509 to the return conduit 506 so as to drain hydraulic pressure medium from the lift ram 504 to the reservoir 502. Such drainage of the hydraulic pressure medium from the lift ram 504 will cause the ram 504 and the fork F positioned thereby to be further lowered and at the option of the operator the fork F may be returned by such operation of the control valve 509 to an extreme lowered position.

Retrieve Function

In order to initiate the retrieve function, one of the level selector switches of FIGS. 7 and 10, or FIGS. 8 and 12, or FIG. 11, may be selectively actuated, as heretofore described, so as to render effective in relation to a selected shelf rack one of the microswitches in the deceleration switch section 457 and retrieve switch section 452. Further, the three-way valve may be positioned by the operator-operative arm 511 of FIG. 13 to the lift position shown.

Thereupon, the operator-operative push button switch 592 of FIGS. 10 and 12 may be actuated to a switch closed position, whereupon the control winding 711 of the retrieve function control relay 552 will be energized through the normally closed heretofore selected microswitch in the switch section 452 causing in turn relay switch arm 717 to direct energizing current through the output conductor 723 of the control network of FIGS. 10 and 12.

The energizing current applied through the output conductor 723 as heretofore described with reference to the Storage Function will then effect energization of the motor 475 and closure of the drift control valve of FIG. 13 and operation of the main and auxiliary pumps 477 and 479 driven by the motor 475 to cause the lift ram 504 to position the fork F upwardly at a maximum speed.

Moreover, as heretofore described, upon the fork F being raised to the deceleration point, the cam 36A actuates the normally open selected microswitch in the deceleration switch section 457 to a closed position to cause energization of the deceleration function control relay 555 to effect the deceleration or decrease in the speed of the ram 504 in raising the fork F, as heretofore explained with reference to the Storage Function.

The deceleration point, as heretofore explained, is below the selected shelf level and also below the retrieve level, while the retrieve level is preset at a level between the deceleration point and the selected shelf level, and below the selected shelf level. Thus the speed at which the fork F is raised will be first decreased as the deceleration point is reached, while at the retrieve level the cam 36A will be correspondingly positioned to open the selected microswitch in the retrieve switch section 452 to terminate the energization of the control winding 717 of the retrieve function relay 552. This in turn will effect de-energization of the motor 475 and completion of the foregoing retrieve function. The cam 36A, as heretofore explained, will continue to retain the selected microswitch in the deceleration switch section 457 in a closed position.

Auxiliary Lift Function

Thereafter, in order to raise the fork F from the retrieve level immediately below the selected shelf level and to a position coinciding with the storage level shown graphically by FIG. 9 so that the fork F may lift or retrieve a load or pallet from a selected shelf, the operator once again closes the same level selector switch as before so as to render effective both the corresponding microswitch in the deceleration switch section 457 closed by the cam 36A and a normally closed selected microswitch in the auxiliary lift and storage switch section 450.

Thereafter, the operator may selectively actuate the auxiliary lift function push button control switch 594 to effect energization of the control winding 631 of the auxiliary lift function relay 554. Such energization is also dependent upon energization of the deceleration function control relay 555 to prevent inadvertent erroneous operation of some other selective level control switch, as heretofore explained with reference to the Auxiliary Lower Function.

Upon the proper energization of the deceleration function control relay 555 and the auxiliary lift function control relay 554, the switch arm 630 of the relay 554 will direct an energizing current through the output line 650 to cause in turn the lift ram 504 to position the fork F upwardly at the decrease rate of speed effected by energized deceleration function control relay 555, as heretofore explained with reference to the Storage Function.

Thus, as the cam 36A, while retaining the selected microswitch of the deceleration switch section 457 closed, is moved further along the lead screw 26A at the decreased speed, the cam 36A opens the selected microswitch of the auxiliary lift and storage switch section 450 at a position of the fork F corresponding to the storage level immediately above the selected shelf level to terminate the auxiliary lift function of operation.

During the lifting of the fork F from the retrieve level to the storage level in such auxiliary lift, as shown graphically by FIG. 9, the fork F in being raised at such decelerated or decreased rate of speed lifts the load or pallet on the selected shelf gently from the shelf.

The fork F may thereafter in bearing the load or pallet be lowered to the extreme lower position by appropriate operation of the operator-operative arm 511 so as to position the three-way valve 509 to a position to drain the hydraulic pressure medium at a controlled rate from the lift ram 504 through the conduit 510, control valve 509 and conduit 506 to the reservoir 502.

Although several forms of the invention have been illustrated and described, various changes in the form and relative arrangements of the parts, which will now appear obvious to those skilled in the art, may be made without departing from the scope of the invention.

What is claimed is:

1. For use in an automatic shelf selector system for a forklift having a movable fork and motor means to actuate the fork to a position to store or retrieve pallets in accordance with a preselected rack shelf pattern; a control device comprising a carrier assembly means, sensor means including a plurality of control switches for the motor means, means responsive to the actuation of the fork by the motor means including a lead screw and a screw nut, cam means, said screw nut supporting the cam means for longitudinal movement along the lead screw, said nut screw being in an operative relation with the lead screw so that the longitudinal movement may be imparted to the cam means upon rotation of the lead screw relative to the carrier assembly means, means for drivingly connecting the fork to the lead screw to cause relative rotation of the lead screw for effecting the longitudinal movement of the cam means along the lead screw in response to the actuation of the fork by the motor means, aid plurality of control switches being supported by the carrier assembly means and extending along the longitudinal path of travel of the cam means, said plurality of control switches including cam follower means sequentially actuated by the cam means in the longitudinal movement of the cam means, an operator-operative selector switch means for selectively rendering at least one of the control switches effective to terminate operation of the motor means upon the cam follower means of said one control switch being actuated by the cam means in response to the actuation of the fork by the motor means to a predetermined position in relation to a preselected rack shelf location in accordance with the preselected rack shelf pattern for the storing or retrieval of the pallets, said carrier assembly means including a pair of longitudinally spaced frame plates, said lead screw being rotatably supported by at least one of the frame plates, said nut screw being in said operative relation with the lead screw, means coupling the nut screw to at least one of the frame plates of the carrier assembly means so that the longitudinal movement may be imparted to the cam means along the lead screw upon a relative angular adjustment being imparted to the lead screw in relation to the frame plates of the carrier assembly means, a plurality of tie rods circumferentially located about said cam means and supporting the plates in spaced relationship, and attaching means securing the control switches on the tie rods along the longitudinal path of travel of the cam means on the lead screw, said attaching means being operably adjusted to preselectively locate the control switches on the tie rods in accordance with the preselected rack shelf pattern.

2. The control device defined by claim 1 including a frame structure for supporting the carrier assembly means, the nut screw being integral with the cam means, spring means connected between one of the frame plates and the cam means for biasing the cam means and thereby the nut screw in one sense and in said operative relation with the lead screw, said spring means providing the means coupling the nut screw integral with the cam means to the carrier assembly means, and means pivotally mounting the carrier assembly means in the supporting frame structure for predetermined angular adjustment of the carrier assembly means relative to the frame structure and the lead screw so that the nut screw and thereby the cam means may be longitudinally adjusted on the lead screw for alternately lagging or leading the rotation of the lead screw in properly locating the fork of the forklift at the predetermined location in relation to the preselected rack shelf location depending upon the storing or retrieval pattern effected by said angular adjustment of the carrier assembly means in one and another senses.

3. The control device defined by claim 1 further comprising an electrical control network including other operator-operative selector switch means, indicator means, and control means for the indicator means, said control means including a plurality of other control switches for the indicator means, said other control switches being operably supported by the carrier assembly means along the longitudinal path of travel of the cam means, said other control switches including cam follower means sequentially actuated by the cam means, said other operator-operative selective switch means rendering at least one of the other control switches effective to cause the indicator means to be operable in response to the position of the fork in relation to the selected shelf location for signifying to the forklift operator that the fork has been properly located for the effective storing or retrieval pattern of operation.

4. In a shelf selector system for a forklift which includes a movable fork and motor means to actuate the fork to positions corresponding to preselected rack shelf locations; a control apparatus comprising carrier assembly means, sensor means including a plurality of control devices for the motor means, a lead screw rotatably supported by the carrier assembly means and extending longitudinally within the carrier assembly means, cam means supported by the lead screw, means drivingly connected between the lead screw and the cam means to position the cam means on the lead screw in a longitudinal path of travel upon rotation of the lead screw relative to the carrier assembly means, means for drivingly connecting the movable fork of the forklift to the lead screw for effecting rotation of the lead screw in response to the actuation of the fork by the motor means, the plurality of control devices being supported by the carrier assembly means and extending within the carrier assembly means along the longitudinal path of travel of the cam means, each of the control devices including a cam follower element selectively actuated in one sense by the cam means during the positioning of the cam means along the lead screw in the longitudinal path of travel, operator-operative control means to initiate operation of the control means and to selectively render at least one of the plurality of control devices effective to terminate operation of the motor means upon the cam follower element of the selected control device being selectively actuated in said one sense by the cam means, the selective actuation of the cam follower element in said one sense being effected by said cam means in response to actuation of the fork by the motor means to a predetermined position in relation to a preselected rack shelf location, said carrier assembly means including longitudinally extending supporting means circumferentially located about the lead screw and cam means, means mounting the control devices on the supporting means along said longitudinal path of travel with the cam follower elements of the control devices extending in a predetermined cooperative relation with the cam means corresponding to the predetermined position in relation to said preselected rack shelf location; said control apparatus also including a frame structure for supporting the carrier assembly means, means coupling the cam means to the carrier assembly means, means pivotally mounting the carrier assembly means in the supporting frame structure, the carrier assembly means being angularly positioned in one sense about the pivotal mounting means and relative to the lead screw so as to casue the cam means to be longitudinally adjusted on the lead screw in a sense for lagging the rotation of the lead screw and alternatively in another and opposite and angular sense about the pivotal mounting means and relative to the lead screw so as to cause the cam means to be longitudinally adjusted on the lead screw in an opposite sense for leading the rotation of the lead screw in properly locating the fork of the forklift at the predetermined position in relation to the preselected rack shelf location corresponding to a storing or retrieval patterns of fork locations effected by said alternative angular adjustments of the carrier assembly means about the pivotal mounting means in said one and said other angular senses.

5. In the shelf selector system defined by claim 4 the control apparatus including a frame structure for supporting the carrier assembly means, means coupling the cam means to the carrier assembly means, means pivotally mounting the carrier assembly means in the supporting frame structure, the carrier assembly means being angularly positioned in one sense about the pivotal mounting means and relative to the lead screw so as to cause the cam means to be longitudinally adjusted on the lead screw in a sense for lagging the rotation of the lead screw and alternatively in another and opposite angular sense about the pivotal mounting means and relative to the lead screw so as to cause the cam means to be longitudinally adjusted on the lead screw in an opposite sense for leading the rotation of the lead screw, other motor means operably connected to said pivotally mounted carrier assembly means, and said operator-operative control means to selectively control said other motor means so as to angularly position the carrier assembly means about said pivotal mounting said means in said one and said other sense for properly locating the fork of the forklift at the predetermined position in relation to the preselected rack shelf location corresponding to a storing or a retrieval pattern of fork locations effected by said alternative angular adjustment of the carrier assembly means about the pivotal mounting means in said one and in said other angular senses.

6. In the shelf selector system defined by claim 4, the control apparatus including the operator-operative control means being selectably operable in one sense to render said at least one of said plurality of control devices effective to terminate the operation of the motor means upon the fork being actuated by the motor means to a predetermined position immediately above the preselected rack shelf location in a storing pattern, and the operator-operative control means being selectably operable in another sense to render said at least one of said plurality of control devices effective to terminate the operation of the motor means upon the fork being actuated by the motor means to a predetermined position immediately below the preselected rack shelf location in a retrieval pattern.

7. In the shelf selector system defined by claim 4, the control apparatus including the operator-operative control means being selectively operable in one sense to render said at least one of said plurality of control devices effective to terminate a first stage of operation of the motor means in a storage pattern upon the fork being actuated by the motor means to a predetermined position immediately above the preselected rack shelf location in the storage pattern, and the operator-operative control means being selectively operable in another sense to render said at least one of said plurality of control devices effective to terminate a first stage of operation of the motor means in a retrieve pattern upon the fork being actuated by the motor means to a predetermined position immediately below the preselected rack shelf location in the retrieve pattern, another of said plurality of control devices being selectively rendered effective by said operator-operative control means, the cam follower element of said selected other control device being selectively actuated in one sense by the cam means in response to actuation of the fork by the motor means to a predetermined deceleration point immediately below said predetermined actuated position of the fork and below said preselected rack shelf location, said cam means retaining said cam follower element of said other control device actuated in said one sense over a predetermined deceleration range extending from said deceleration point to the other predetermined actuated position of the fork immediately above the preselected rack shelf location, auxiliary control means for said motor means including relay means rendered effective by said selected other control device upon the cam follower element of the other control device being actuated in said one sense by the cam means, the auxiliary control means effecting a decrease in the speed of the actuation of the fork by the motor means in response to the relay means being rendered effective by said selected other control device, said operator-operative control means being selectively operable in an auxiliary sense in the storage pattern and alternatively in the retrieve pattern upon the termination of the first stage of operation of the motor means and so long as said relay means may be rendered effective by said selected other control device, said operator-operative control means being selectively operable in said auxiliary sense in the storage pattern to reinitiate operation of the motor means to lower the fork from said predetermined position immediately above the preselected rack shelf location in the storage pattern to a predetermined auxiliary position below the preselected rack shelf location, a further control device of said plurality of control devices being selectively rendered effective by said operator-operative control means to terminate the auxiliary lowering operation of the motor means upon the cam follower element of said selected further control device being selectively actuated in one sense by the cam means, the selective actuation of the cam follower element of said further control device in said one sense being effected by said cam means in response to the lowering of the fork by the motor means to said auxiliary position below the preselected rack shelf location in the storage pattern; and said operator-operative control means being selectively operable in said auxiliary sense in the retrieve pattern to re-initiate operation of the motor means to raise the fork from said predetermined position immediately below the preselected rack shelf location in the retrieve pattern to a predetermined auxiliary position immediately above the preselected rack shelf location, and said operator-operative control means being selectively operable to render said at least one of said plurality of control devices effective to terminate the operation of the motor means upon the fork being raised by the motor means to said auxiliary raised position above the preselected rack shelf location in the retrieve pattern.

* * * * *